US012776031B2

(12) United States Patent
Friedlein et al.

(10) Patent No.: US 12,776,031 B2
(45) Date of Patent: Oct. 27, 2026

(54) APPARATUS, SYSTEMS AND METHODS FOR IMAGE PLANT COUNTING

(71) Applicant: Ag Leader Technology, Ames, IA (US)

(72) Inventors: Aaron Friedlein, Farmersburg, IA (US); Mike Custer, Minocqua, WI (US); Corey Weddle, Ames, IA (US)

(73) Assignee: Ag Leader Technology, Ames, IA (US)

( * ) Notice: Subject to any disclaimer, the term of this patent is extended or adjusted under 35 U.S.C. 154(b) by 376 days.

(21) Appl. No.: 18/209,331

(22) Filed: Jun. 13, 2023

(65) Prior Publication Data

US 2023/0401703 A1 Dec. 14, 2023

Related U.S. Application Data

(60) Provisional application No. 63/351,602, filed on Jun. 13, 2022.

(51) Int. Cl.

*G06K 9/00* (2022.01)
*G06T 7/00* (2017.01)
(Continued)

(52) U.S. Cl.

CPC ............ *G06T 7/0012* (2013.01); *G06T 7/194* (2017.01); *G06T 11/10* (2026.01);
(Continued)

(58) Field of Classification Search

CPC ..... G06T 7/0012; G06T 7/194; G06T 11/001; G06T 2207/10024; G06T 2207/10028;
(Continued)

(56) References Cited

U.S. PATENT DOCUMENTS

| | | | |
|---|---|---|---|
| 2,419,061 | A | 4/1947 | Emery |
| 2,813,709 | A | 11/1957 | Hyman |

(Continued)

FOREIGN PATENT DOCUMENTS

| | | | |
|---|---|---|---|
| AU | 2020201559 A1 | 4/2020 | |
| BE | 1023764 B1 | 7/2017 | |

(Continued)

OTHER PUBLICATIONS

Li, Dawei, et al. "An overlapping-free leaf segmentation method for plant point clouds." IEEE Access 7 (2019): 129054-129070. (Year: 2019).*

(Continued)

*Primary Examiner* — Gregory A Morse
*Assistant Examiner* — Owais I Memon
(74) *Attorney, Agent, or Firm* — DENTONS DAVIS BROWN PC; Matthew Warner-Blankenship; Kassandra Rittmer

(57) ABSTRACT

A method for evaluating post emergence crops, comprising: capturing images of an area of interest at a first point in time; geo-referencing the images with as-planted data; processing the images to isolate individual plants with the images; modeling the surface of the individual plants; generating at least one crop characteristic for each individual plant; identifying a location for each individual plant; and comparing the locations with as-planted data of expected plant locations.

20 Claims, 17 Drawing Sheets

(51) Int. Cl.
*G06T 7/194* (2017.01)
*G06T 11/10* (2026.01)

(52) U.S. Cl.
CPC ............... *G06T 2207/10024* (2013.01); *G06T 2207/10028* (2013.01); *G06T 2207/30188* (2013.01); *G06T 2207/30242* (2013.01)

(58) Field of Classification Search
CPC . G06T 2207/30188; G06T 2207/30242; G06T 2207/20081
See application file for complete search history.

(56) References Cited

U.S. PATENT DOCUMENTS

| | | | |
|---|---|---|---|
| 3,007,570 | A | 11/1961 | Davidson |
| 3,038,544 | A | 6/1962 | Richey et al. |
| 3,178,873 | A | 4/1965 | Meyer |
| 3,246,701 | A | 4/1966 | Horst |
| 3,271,940 | A | 9/1966 | Robert |
| 3,616,690 | A | 11/1971 | Harden |
| 3,780,817 | A | 12/1973 | Videon |
| 3,853,000 | A | 12/1974 | Barnett |
| 3,972,381 | A | 8/1976 | Gail |
| 3,992,933 | A | 11/1976 | Randolph |
| 4,121,049 | A | 10/1978 | Roeber |
| 4,126,984 | A | 11/1978 | Gail |
| 4,166,349 | A | 9/1979 | Coenenberg et al. |
| 4,197,690 | A | 4/1980 | Eistert |
| 4,295,323 | A | 10/1981 | Maier et al. |
| 4,362,218 | A | 12/1982 | Shoberg |
| 4,418,521 | A | 12/1983 | Orlando |
| 4,423,640 | A | 1/1984 | Jetter |
| 4,505,094 | A | 3/1985 | Demorest |
| 4,528,804 | A | 7/1985 | Williams |
| 4,751,849 | A | 6/1988 | Paros |
| 4,883,964 | A | 11/1989 | Bohman |
| 4,896,491 | A | 1/1990 | Warnsholz |
| 4,918,441 | A | 4/1990 | Bohman |
| 4,967,362 | A | 10/1990 | Schutten et al. |
| 5,044,210 | A | 9/1991 | Kuhn et al. |
| 5,216,795 | A | 6/1993 | Hansson |
| 5,264,709 | A | 11/1993 | Kamimura |
| 5,343,761 | A | 9/1994 | Myers |
| 5,369,603 | A | 11/1994 | Myers |
| 5,463,854 | A | 11/1995 | Chmielewski, Jr. |
| 5,480,354 | A | 1/1996 | Sadjadi |
| 5,568,405 | A | 10/1996 | Easton et al. |
| 5,598,794 | A | 2/1997 | Harms et al. |
| 5,638,988 | A | 6/1997 | Rogers |
| 5,680,750 | A | 10/1997 | Stefl |
| 5,751,576 | A | 5/1998 | Monson |
| 5,790,428 | A | 8/1998 | Easton et al. |
| 5,847,290 | A | 12/1998 | Kim |
| 5,878,561 | A | 3/1999 | Gunn |
| 5,921,070 | A | 7/1999 | Chamberlain |
| 5,927,054 | A | 7/1999 | Chamberlain |
| 5,991,694 | A | 11/1999 | Gudat et al. |
| 6,041,583 | A | 3/2000 | Goering |
| 6,073,427 | A | 6/2000 | Nichols |
| 6,085,846 | A | 7/2000 | Buchl et al. |
| 6,092,476 | A | 7/2000 | Wilson |
| 6,119,442 | A | 9/2000 | Hale |
| 6,202,395 | B1 | 3/2001 | Gramm |
| 6,216,795 | B1 | 4/2001 | Buchl |
| 6,272,819 | B1 | 8/2001 | Wendte |
| 6,431,981 | B1 | 8/2002 | Shinners |
| 6,525,276 | B1 | 2/2003 | Vellidus |
| 6,530,197 | B1 | 3/2003 | Christensen |
| 6,584,390 | B2 | 6/2003 | Beck |
| 6,615,570 | B2 | 9/2003 | Beck |
| 6,668,223 | B2 | 12/2003 | Blackmore et al. |
| 6,774,320 | B2 | 8/2004 | Simons |
| 6,983,582 | B1 | 1/2006 | Muckler |
| 7,354,341 | B1 | 4/2008 | Smith |
| 7,357,036 | B2 | 4/2008 | Steprath |
| 7,401,506 | B2 | 7/2008 | Kunow |
| 7,401,528 | B2 | 7/2008 | Deppermann et al. |
| 7,647,753 | B2 | 1/2010 | Schlipf |
| 7,716,905 | B2 | 5/2010 | Wilcox et al. |
| 7,739,861 | B2 | 6/2010 | Mackin |
| 7,790,991 | B2 | 9/2010 | Verhaeghe |
| 7,916,898 | B2 | 3/2011 | Anderson |
| 8,006,472 | B1 | 8/2011 | Schreiner |
| 8,010,261 | B2 | 8/2011 | Brubaker |
| 8,196,380 | B2 | 6/2012 | Carboni |
| 8,201,388 | B1 | 6/2012 | Vandeven |
| 8,215,191 | B2 | 7/2012 | Tragesser et al. |
| 8,220,235 | B2 | 7/2012 | Kowalchuk |
| 8,224,534 | B2 | 7/2012 | Kowalchuk |
| 8,418,636 | B2 | 4/2013 | Liu et al. |
| 8,820,039 | B2 | 9/2014 | Werning |
| 8,987,615 | B2 | 3/2015 | Khatavkar |
| 9,030,549 | B2 | 5/2015 | Redden |
| 9,064,173 | B2 | 6/2015 | Redden |
| 9,066,463 | B2 | 6/2015 | Lange |
| 9,213,905 | B2 | 12/2015 | Lange |
| 9,232,693 | B2 | 1/2016 | Hendrickson et al. |
| 9,282,693 | B2 | 3/2016 | Anderson |
| 9,310,329 | B2 | 4/2016 | Acheson et al. |
| 9,320,196 | B2 | 4/2016 | Dybro et al. |
| 9,322,629 | B2 | 4/2016 | Sauder et al. |
| 9,360,383 | B2 | 6/2016 | Coleman |
| 9,372,109 | B2 | 6/2016 | Acheson et al. |
| 9,410,840 | B2 | 8/2016 | Acheson et al. |
| 9,423,249 | B2 | 8/2016 | Deppermann et al. |
| 9,485,914 | B2 | 11/2016 | Schleicher et al. |
| 9,565,802 | B2 | 2/2017 | Schleicher |
| 9,578,804 | B2 | 2/2017 | Gessel |
| 9,578,808 | B2 | 2/2017 | Dybro |
| 9,609,806 | B2 | 4/2017 | Schlipf |
| 9,645,006 | B2 | 5/2017 | Phelan |
| 9,658,201 | B2 | 5/2017 | Redden et al. |
| 9,668,412 | B2 | 6/2017 | Ritter |
| 9,668,420 | B2 | 6/2017 | Anderson |
| 9,693,496 | B2 | 7/2017 | Tevs et al. |
| 9,693,503 | B2 | 7/2017 | Dybro et al. |
| 9,696,162 | B2 | 7/2017 | Anderson |
| 9,717,171 | B2 | 8/2017 | Redden et al. |
| 9,756,771 | B2 | 9/2017 | Redden |
| 9,804,097 | B1 | 10/2017 | Tang et al. |
| 9,826,673 | B1 | 11/2017 | Ray |
| 9,832,928 | B2 | 12/2017 | Dybro et al. |
| 9,867,334 | B2 | 1/2018 | Jongmans et al. |
| 9,867,335 | B1 | 1/2018 | Obbink et al. |
| 9,894,835 | B2 | 2/2018 | Sauder et al. |
| 9,921,064 | B2 | 3/2018 | Schleicher |
| 9,927,242 | B2 | 3/2018 | Schleicher |
| 9,936,631 | B1 | 4/2018 | Hubner et al. |
| 9,936,637 | B2 | 4/2018 | Anderson et al. |
| 9,972,058 | B2 | 5/2018 | Romier |
| 9,974,233 | B2 | 5/2018 | Ueda et al. |
| 9,983,048 | B1 | 5/2018 | Meier |
| 10,034,424 | B2 | 7/2018 | Anderson |
| 10,039,228 | B2 | 8/2018 | Walker |
| 10,039,231 | B2 | 8/2018 | Anderson et al. |
| 10,130,035 | B2 | 11/2018 | Crow |
| 10,178,828 | B2 | 1/2019 | Hendrickson et al. |
| 10,188,037 | B2 | 1/2019 | Sauder |
| 10,255,670 | B1 | 4/2019 | Wu |
| 10,295,703 | B2 | 5/2019 | Dybro |
| 10,299,422 | B2 | 5/2019 | Schleicher |
| 10,473,592 | B2 | 11/2019 | Kramer et al. |
| 10,537,060 | B2 | 1/2020 | Sauder et al. |
| 10,582,662 | B2 | 3/2020 | Ricketts |
| 10,713,768 | B2 | 7/2020 | Berghoefer |
| 10,820,508 | B2 | 11/2020 | Dix et al. |
| 10,859,479 | B2 | 12/2020 | Brune et al. |
| 11,048,938 | B2 | 6/2021 | Hundley et al. |
| 11,064,653 | B2 | 7/2021 | Zielke |
| 11,079,725 | B2 | 8/2021 | Palla |
| 11,129,333 | B2 | 9/2021 | Derscheid |
| 11,234,366 | B2 | 2/2022 | Darr |
| 11,275,941 | B2 | 3/2022 | Papanikolopoulos et al. |

(56) References Cited

U.S. PATENT DOCUMENTS

| | | | | |
|---|---|---|---|---|
| 11,297,768 | B2 | 4/2022 | Schildroth | |
| 11,432,464 | B2 | 9/2022 | Hayashi | |
| 11,678,607 | B2 | 6/2023 | Zielke | |
| 11,704,810 | B2 | 7/2023 | Sneyders | |
| 11,758,845 | B2 | 9/2023 | Zielke | |
| 11,758,848 | B2 | 9/2023 | Eichhorn | |
| 2002/0091458 | A1 | 7/2002 | Moore | |
| 2002/0173893 | A1 | 11/2002 | Blackmore et al. | |
| 2003/0019196 | A1 | 1/2003 | Coers | |
| 2004/0050138 | A1 | 3/2004 | Beck | |
| 2004/0194442 | A1 | 10/2004 | Maertens | |
| 2007/0044445 | A1 | 3/2007 | Spicer et al. | |
| 2007/0228707 | A1 | 10/2007 | Curtis | |
| 2007/0289281 | A1 | 12/2007 | Altepost | |
| 2008/0046154 | A1 | 2/2008 | Bares | |
| 2008/0289308 | A1 | 11/2008 | Brubaker | |
| 2009/0192734 | A1 | 7/2009 | Mackin | |
| 2010/0089178 | A1 | 4/2010 | Tragresser | |
| 2010/0228521 | A1 | 9/2010 | Hamamoto | |
| 2011/0173942 | A1 | 7/2011 | Kowalchuk | |
| 2012/0029757 | A1 | 2/2012 | Kowalchuk | |
| 2012/0042618 | A1 | 2/2012 | Lohrentz | |
| 2012/0042619 | A1 | 2/2012 | Lohrentz et al. | |
| 2012/0055131 | A1 | 3/2012 | Zegota | |
| 2012/0055133 | A1 | 3/2012 | Lohrentz | |
| 2012/0204528 | A1 | 8/2012 | Regier | |
| 2012/0253611 | A1 | 10/2012 | Zielke | |
| 2013/0125800 | A1 | 5/2013 | Landphair et al. | |
| 2013/0152535 | A1 | 6/2013 | Roberge | |
| 2014/0020354 | A1 | 1/2014 | Tilly | |
| 2014/0116077 | A1 | 5/2014 | Pierce | |
| 2014/0230391 | A1 | 8/2014 | Hendrickson | |
| 2014/0230580 | A1 | 8/2014 | Dybro | |
| 2014/0236381 | A1 | 8/2014 | Anderson | |
| 2014/0294247 | A1* | 10/2014 | Sirault | G06T 17/20 382/110 |
| 2014/0311113 | A1 | 10/2014 | Bonefas | |
| 2014/0331631 | A1 | 11/2014 | Sauder | |
| 2015/0082760 | A1 | 3/2015 | Zentner | |
| 2015/0082780 | A1 | 3/2015 | Dueckinghaus | |
| 2015/0245560 | A1 | 9/2015 | Middelberg | |
| 2015/0253427 | A1 | 9/2015 | Slitcher | |
| 2015/0257337 | A1 | 9/2015 | Schrattenecker | |
| 2015/0289438 | A1 | 10/2015 | Sauder et al. | |
| 2015/0293029 | A1 | 10/2015 | Acheson | |
| 2015/0293068 | A1 | 10/2015 | Acheson et al. | |
| 2015/0302305 | A1 | 10/2015 | Rupp | |
| 2015/0319929 | A1 | 11/2015 | Hendrickson | |
| 2015/0327440 | A1 | 11/2015 | Dybro | |
| 2015/0334920 | A1 | 11/2015 | Schleicher | |
| 2016/0037709 | A1 | 2/2016 | Sauder et al. | |
| 2016/0041803 | A1 | 2/2016 | Markov | |
| 2016/0077075 | A1 | 3/2016 | Reich | |
| 2016/0084813 | A1 | 3/2016 | Anderson | |
| 2016/0084987 | A1 | 3/2016 | Dybro | |
| 2016/0120129 | A1 | 5/2016 | Verhaeghe | |
| 2016/0174465 | A1 | 6/2016 | Kohls | |
| 2016/0252384 | A1 | 9/2016 | Wilson | |
| 2016/0338267 | A1 | 11/2016 | Anderson | |
| 2016/0345485 | A1 | 12/2016 | Acheson | |
| 2017/0061211 | A1 | 3/2017 | Hundley et al. | |
| 2017/0089742 | A1 | 3/2017 | Bruns | |
| 2017/0199528 | A1 | 7/2017 | Detweiler | |
| 2017/0228118 | A1 | 8/2017 | Sugumarn et al. | |
| 2017/0251600 | A1 | 9/2017 | Anderson | |
| 2017/0332551 | A1 | 11/2017 | Todd | |
| 2017/0339827 | A1 | 11/2017 | Anderson | |
| 2018/0017965 | A1 | 1/2018 | Kosa | |
| 2018/0084725 | A1 | 3/2018 | Ostermeier | |
| 2018/0092303 | A1 | 4/2018 | Goering | |
| 2018/0121725 | A1* | 5/2018 | Redden | G06V 20/188 |
| 2018/0164471 | A1 | 6/2018 | Dybro | |
| 2018/0199509 | A1 | 7/2018 | Ricketts | |
| 2018/0228086 | A1 | 8/2018 | Cook | |
| 2018/0338423 | A1 | 11/2018 | Lucca | |
| 2018/0368321 | A1 | 12/2018 | Noonan | |
| 2018/0373259 | A1 | 12/2018 | Aberle | |
| 2019/0000007 | A1 | 1/2019 | Schleicher | |
| 2019/0059223 | A1 | 2/2019 | Seiders | |
| 2019/0110394 | A1 | 4/2019 | VanNahmen | |
| 2019/0150357 | A1* | 5/2019 | Wu | H04N 7/188 |
| 2019/0174667 | A1 | 6/2019 | Gresch | |
| 2019/0195762 | A1 | 6/2019 | Brune | |
| 2019/0258859 | A1* | 8/2019 | Baynes | A01B 49/06 |
| 2019/0261561 | A1 | 8/2019 | Heitmann | |
| 2020/0000031 | A1 | 1/2020 | Koch | |
| 2020/0000034 | A1 | 1/2020 | Schlipf | |
| 2020/0008351 | A1 | 1/2020 | Zielke | |
| 2020/0053961 | A1 | 2/2020 | Dix | |
| 2020/0060056 | A1* | 2/2020 | Koch | A01C 21/00 |
| 2020/0068803 | A1 | 3/2020 | Sauder et al. | |
| 2020/0221635 | A1 | 7/2020 | Hendrickson | |
| 2020/0326674 | A1 | 10/2020 | Palla | |
| 2020/0344948 | A1 | 11/2020 | Li | |
| 2020/0394580 | A1 | 12/2020 | Bull | |
| 2021/0051849 | A1 | 2/2021 | Asebedo | |
| 2021/0059114 | A1 | 3/2021 | Eichhorn | |
| 2021/0076569 | A1 | 3/2021 | Blank | |
| 2021/0132618 | A1 | 5/2021 | Van Roekel | |
| 2021/0168991 | A1 | 6/2021 | Dix | |
| 2021/0195824 | A1 | 7/2021 | Van Roekel | |
| 2021/0315160 | A1 | 10/2021 | Zielke | |
| 2021/0318118 | A1 | 10/2021 | Eichhorn | |
| 2021/0321567 | A1 | 10/2021 | Sidon | |
| 2021/0329837 | A1 | 10/2021 | Schnaider | |
| 2021/0329838 | A1 | 10/2021 | Zielke | |
| 2021/0340794 | A1 | 11/2021 | Dickinson | |
| 2021/0352847 | A1 | 11/2021 | Hunt | |
| 2022/0000024 | A1 | 1/2022 | Zielke | |
| 2022/0000029 | A1 | 1/2022 | Ricketts | |
| 2022/0071093 | A1 | 3/2022 | Risius | |
| 2022/0078975 | A1 | 3/2022 | Slichter | |
| 2022/0132737 | A1 | 5/2022 | Anderson | |
| 2022/0192082 | A1 | 6/2022 | Rosenberg | |
| 2022/0225569 | A1 | 7/2022 | Zielke | |
| 2022/0232759 | A1 | 7/2022 | Sauder | |
| 2022/0317688 | A1 | 10/2022 | Li | |
| 2022/0386527 | A1 | 12/2022 | Schleicher | |
| 2023/0000015 | A1 | 1/2023 | Herrmann | |
| 2023/0073551 | A1 | 3/2023 | Holoubek | |
| 2023/0139169 | A1 | 5/2023 | Cleodolphi | |
| 2023/0189690 | A1 | 6/2023 | Friedlein | |
| 2023/0229163 | A1 | 7/2023 | Rust | |
| 2023/0240185 | A1 | 8/2023 | Zielke | |
| 2023/0243693 | A1 | 8/2023 | McClelland | |
| 2023/0292664 | A1 | 9/2023 | Zielke | |
| 2023/0389473 | A1 | 12/2023 | Reed | |
| 2023/0401703 | A1 | 12/2023 | Friedlein | |
| 2024/0023482 | A1 | 1/2024 | Zielke | |
| 2024/0065156 | A1 | 2/2024 | Woodcock | |
| 2024/0081171 | A1 | 3/2024 | Schwartz | |
| 2024/0090379 | A1 | 3/2024 | Eichhorn | |
| 2024/0373785 | A1 | 11/2024 | Risius | |
| 2024/0389494 | A1 | 11/2024 | Vorobiev | |
| 2025/0185540 | A1 | 6/2025 | Eichhorn | |
| 2025/0194459 | A1 | 6/2025 | Roe | |
| 2025/0351773 | A1 | 11/2025 | Zielke | |
| 2026/0060174 | A1 | 3/2026 | Zielke | |
| 2026/0083057 | A1 | 3/2026 | Zielke | |
| 2026/0096511 | A1 | 4/2026 | Zielke | |
| 2026/0107878 | A1 | 4/2026 | Risius | |
| 2026/0110552 | A1 | 4/2026 | Johnson | |
| 2026/0137029 | A1 | 5/2026 | Friedlein | |

FOREIGN PATENT DOCUMENTS

| | | | |
|---|---|---|---|
| BR | 102017018379 | A2 | 5/2018 |
| CA | 2313376 | A1 | 7/2000 |
| DE | 1928065 | A1 | 5/1970 |
| DE | 102013110498 | A1 | 3/2015 |
| DE | 112014000906 | T5 | 11/2015 |
| EP | 2191439 | B1 | 2/2009 |
| EP | 2047738 | A2 | 4/2009 |
| EP | 3146831 | B1 | 3/2017 |

(56) References Cited

FOREIGN PATENT DOCUMENTS

| | | | |
|---|---|---|---|
| EP | 2944179 | B1 | 11/2017 |
| EP | 3245859 | A1 | 11/2017 |
| EP | 3245859 | B1 | 4/2019 |
| EP | 3095313 | B1 | 5/2019 |
| EP | 3972381 | A1 | 3/2022 |
| JP | 6216795 | B2 | 10/2017 |
| WO | 2013078328 | A2 | 5/2013 |
| WO | 2023288249 | A1 | 1/2023 |

OTHER PUBLICATIONS

Luck et al, "Precision Agriculture—Best Management Practices for Collecting Accurate Yield Data and Avoiding Errors during Harvest", 2014, 6 pages.
Baweja, Harjatin & Parhar, Tanvir & Mirbod, Omeed & Nuske, Stephen. (2018). StalkNet: A Deep Learning Pipeline for High-Throughput Measurement of Plant Stalk Count and Stalk Width.
Birrell et al., "Corn Population Sensor for Precision Farming", "American Society of Agricultural Engineers. Annual Meeting", 1995, vol. 95, No. 1334, Publisher: ASAE.
D. Easton, "Corn Population and Plant Spacing Variability: The Next Mapping Layer", 1996, pp. 723-727, Publisher: ASA-CSSA-SSSA, Published in: Madison, WI.
Drago, Row by Row 2020 Special Report Harvest Study Reveals Most Corn Heads Leaving Yield in the Field.
Farm Show, "Easton Goers, Inc. Space Wheel Checks Seed Placement In Field—Space Cadet", 1996, Publisher: Farm Show.
Gore, L. M. 1996. Report: Stalk counter for VRT study fall of 1995. Deere & Co. Moline, IL.
Haizhou Li, "Design and Evaluation of a Non-Intrusive Corn Population Sensor", "Trace: Tennessee Research and Creative Exchange, Doctoral Dissertations, Graduate School", Aug. 2007, Publisher: University of Tennessee, Knoxville.
Headsight, Inc., "Row Guidance for Corn", Jan. 2021, https://headsight.com/row-guidance-corn.
Hummel et al., "Sensing Corn Population—Another Variable in the Yield Equation".
John Deere SSA, "AutoTrac RowSense | Precision AG | John Deere SSA", Jan. 2021, https://www.deere.com/sub-saharan/en/technology-products/precision-ag/autotrac-rowsense/.
Jonathan P. Kelly, "By-Plant Prediction of Corn (*Zea mays* L.) Grain Yield Using Height and Stalk Diameter", 2009, Publisher: Faculty of the Graduate College of the Oklahoma State University.
Luck et al., "Sensor Ranging Technique for Determining Corn Plant Population", "Faculty Papers and Publications in Animal Science—Animal Science Department", 2008, vol. 920, Publisher: University of Nebraska—Lincoln.
Plattner, C. E., J. W. Hummel 1996. Corn Plant Population Sensor for Precision Agriculture. In: P.C. Robert, R.H. Rust, W.E. Larson, editors, Precision Agriculture, ASA, CSSA, SSSA, Madison, WI. p. 785-794.
Reichhardt Electronic Innovations, "PSR Sensor Guidance", Jan. 2021, www.reichhardt.com/us_products_autosteer-system_autoguidance-tac.html.
Shrestha et al., "Automatic Corn Plant Population Measurement Using Machine Vision", "Transactions of the ASAE", 2003, pp. 559-565, vol. 46(2), Publisher: American Society of Agricultural Engineers.
Sudduth, K.A., Birrell, S.J., Krumpelman, M.J., Robert, P., Rust, R.H., & Larson, W.E. (2000). Field evaluation of a corn population sensor.
Yeyin Shi, "Corn Plant Location, Spacing and Stalk Diameter Measurements Using Optical Sensing Technologies", May 2014, Publisher: Faculty of the Graduate College of the Oklahoma State University.
Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, Dec. 2009, pp. 33-36.
Contributions to Wikimedia projects (Feb. 20, 2020), Numerical integration. Wikipedia. Https://web.archive.org/web/20200325094046/https://en.wikipedia.org/wiki/numerical_integration (Year: 2020).
Area of a circle (Mar. 10, 2020). Wikipedia. Https://web.archive.org/web/20200325064526/https://en.wikipedia.org/wiki/Area_of_acircle (year 2020).
Miller et al (Nov. 16, 2016). The Plant Journal. https://onlinelibrary.wiley.com/doi/pdf/10.1111/tpj.13320.
Of GIS Ag Maps (here in as GIS), "Yield Monitor Data Post-Calibration (Linear and Non-Linear) Examples", Jan. 20, 2022, 8 pages + 1 SS page (9 pgs total).
Sprague et al., "Corn Ear Detection and Orientation Estimation Using Deep Learning", 2024, https://arxiv.org/abs/2412.14954.
Lensing, Keith, "Algorithm Development of a Multi-Section Crop Detection System for a Corn Head", 2015, https://dr.lib.iastate.edu/entities/publication/8cb6f0d6-31e2-4ff9-8c1e-eb70dc210e5f.

* cited by examiner

20

| Main Layer | | | | | | |
|---|---|---|---|---|---|---|
| Total area | 0.00 ac | | | | | |
| Length | 0.00 ft | | | | | |
| Count | 1197 | | | | | |
| **Description** | **Average** | **Total** | **Minimum** | **Maximum** | **Standard Deviation** | **C.V.** |
| Population | 29.47 ksds/ac | 0.00 ksds | 0.00 ksds/ac | 331.49 ksds/ac | 17.93 ksds/ac | 0.609 |
| Seed Spacing | 8.489 in | | 0.00 in | 34.01 in | 4.188 in | 0.493 |
| **Description** | **Value** | **Area** | **Length** | **Count** | | |
| Pass Number | | | | | | |
| | -1 | 0.00 ac | 0.00 ft | 21 | | |
| | 5001 | 0.00 ac | 0.00 ft | 82 | | |
| | 5002 | 0.00 ac | 0.00 ft | 100 | | |
| | 5003 | 0.00 ac | 0.00 ft | 98 | | |
| | 5004 | 0.00 ac | 0.00 ft | 93 | | |
| | 5005 | 0.00 ac | 0.00 ft | 103 | | |
| | 5006 | 0.00 ac | 0.00 ft | 99 | | |
| | 5007 | 0.00 ac | 0.00 ft | 113 | | |
| | 5008 | 0.00 ac | 0.00 ft | 108 | | |
| | 5009 | 0.00 ac | 0.00 ft | 98 | | |
| | 5010 | 0.00 ac | 0.00 ft | 88 | | |
| | 5011 | 0.00 ac | 0.00 ft | 98 | | |
| | 5012 | 0.00 ac | 0.00 ft | 96 | | |

FIG. 13

APPARATUS, SYSTEMS AND METHODS FOR IMAGE PLANT COUNTING

CROSS-REFERENCE TO RELATED APPLICATION(S)

This application claims the benefit under 35 U.S.C. § 119(e) to U.S. Provisional Application 63/351,602, filed Jun. 13, 2022, and entitled APPARATUS, SYSTEMS AND METHODS FOR IMAGE PLANT COUNTING, which is hereby incorporated herein by reference in its entirety for all purposes.

TECHNICAL FIELD

The disclosure relates to identification and quantification of plants and various characteristics thereof.

BACKGROUND

There are various known sensors may be present on the planter that can monitor what is dropped in the rows to be planted (seeds). These known sensors do not provide data on plant emergence nor active growth for the growing season.

To determine plant emergence and/or active growth currently a grower can go out and measure a fixed length of a row, and manually count the number of emerged plants which is very time consuming and prone to human error. The additional challenge with this is that it generally happens on a small-scale comparative to the rest of the field. Further there is not a clear or reliable way of accurately knowing the row of the planter that the count came from.

One issue with manually counting a small area is that generally a grower will count 3-4 rows in a location that represent a 1/1,000 of an acre (generally about 17.5 ft of a 30" spaced row). By manually counting in this manner, it may not be observed, nor be obvious which rows of the planter planted the counted 3-4 rows. Further by manually counting it is difficult to count the plants in the same location a week or two later to see if additional stand emerged. Further, if the grower uses variable rate seeding, where parts of the field get a different seeding rate than other parts, it may not be known what seeding rate was applied at the counted location.

Additionally, there are certain known drone systems that can provide some rudimentary knowledge regarding plant population/stand. These currently known systems have a number of drawbacks including a lack of utility and useful information that can be provided.

BRIEF SUMMARY

The most common current practice for obtaining stand information prior to harvest is manual stand counting, as discussed above. This requires a lot of labor and walking into the field, marking off a distance and doing the counts one row at a time. This is very time consuming and often times limits how many counts are done in a field. This process also makes repeatability of counts difficult to manage. In addition, data collected for the manual counts is often handwritten or manually entered into a spreadsheet and would not contain any spatial locations of the plants. Additionally, the current manual process does not allow for an easy or accurate way to tie the stand counts to other data, such as yield data, planter row that placed the seed, or multi-spectral imagery which limits the usefulness of the data being manually collected.

Being able to count plants in very quick and accurate manner over a large area of a production/research/test field, provides helpful information for a grower to know if the stand that they planted has emerged evenly, and at the expected population. Additionally, having spatial locations and other data layered with the stand and emergence data provides helpful information for future agronomic decisions.

Using a georeferenced image allows a grower to capture a much larger area of the field. Subsequently, this means that a grower can gain a better understanding of the true emerged population of a crop. Additional advantages of using the system and methods described herein include capturing multiple planter passes to identify trends of each row, as well as plants that are not part of the intended crop. Further, a grower or the system can combine the imagery as discussed herein with recorded planting GIS data to index the plant counts to the planter pass. Still further, if the grower uses variable rate seeding the grower can map the various seeding rates on the imagery to know what was intended, and what the emerged plant stand actually is. Still further, the disclosed systems and method provide the opportunity to identify trends amongst the rows of the planter, such as to see if one row had fewer plants emerge than others. Identifying the size of plants at an early stage can also be advantageous to gauge the emergence from each row. The various data gathered and analyzed by the system can lead to identifying wear parts that need to be replaced, or settings on the planter row that were not adjusted properly. Other metrics like leaf area, canopy closure, plant stand are significant improvements to what has been done prior.

One example includes a method of counting plants in a field. This example of counting plants also includes acquiring images of crops, mapping (georeferencing) and processing the images, optionally stitching images of planted crops together, and estimating one or more crop characteristics such as plant number, location, size, emergence, growth stage, and the like from the processed images. In various implementations, these crop characteristics can be used in conjunction with other data gathered, such as data gathered during planting, stored by the user, and/or from other sources. Other implementations of this example include corresponding computer systems, apparatus, and computer programs recorded on one or more computer storage devices, each configured to perform the actions of the methods.

In Example 1, a method for evaluating post-emergence crop stands, comprising: collecting images of an area of interest; geo-referencing the collected images; processing the collected images to isolate individual plants within the collected images; and determining at least one plant characteristic for each individual plant within the collected images.

Example 2 relates to the method of Example 1, wherein the at least one plant characteristic is selected from leaf length, orientation, surface area, and color.

Example 3 relates to the method of any of Examples 1-2, wherein processing the collected images comprises adjusting color levels within the collected images to isolate a plant color of interest.

Example 4 relates to the method of any of Examples 1-3, further comprising performing a triangulation routine.

Example 5 relates to the method of any of Examples 1-4, further comprising defining a pixel threshold wherein a triangle with a side with a pixel range below the pixel threshold is considered part of a plant and a triangle with a side with pixel range above the pixel threshold is considered background.

Example 6 relates to the method of any of Examples 1-5, further comprising defining a threshold distance within a triangle with a side with a distance below the threshold distance is considered part of a plant and a triangle with a side with a distance above the threshold distance is considered background.

Example 7 relates to the method of any of Examples 1-6, further comprising removing background from the collected images.

Example 8 relates to the method of any of Examples 1-7, further comprising identifying a central point of each triangle comprised of plant pixels; connecting each of the central points; and identifying a junction of two or more central points to locate a stem of the plant.

Example 9 relates to the method of any of Examples 1-8, further comprising counting each plant within the collected images to determine a stand count.

Example 10 relates to the method of any of Examples 1-9, further comprising comparing leaf length and surface area.

Example 11 relates to the method of any of Examples 1-10, further comprising merging collected images with geo-referenced as-planted data.

Example 12 relates to the method of any of Examples 1-11, further comprising merging collected images with geo-referenced harvest data.

Example 13 relates to the method of any of Examples 1-12, further comprising identifying volunteer plants and weeds.

Example 14 relates to the method of any of Examples 1-13, further comprising identifying late emerged plants.

Example 15 relates to the method of any of Examples 1-14, further comprising: collecting imagery of the area of interest at a second point in time; and overlaying the collected imagery from the second point in time with the collected imagery.

In Example 16, a method for evaluating post emergence crops, comprising: capturing images of an area of interest at a first point in time; geo-referencing the images with as-planted data; processing the images to isolate individual plants with the images; modeling the surface of the individual plants; generating at least one crop characteristic for each individual plant; identifying a location for each individual plant; and comparing the locations with as-planted data of expected plant locations.

Example 17 relates to the method of Example 16, further comprising generating a point map of each plant location.

Example 18 relates to the method of any of Examples 16-17, further comprising categorizing a plant growth stage for each individual plant and mapping the plant growth stage on the point map.

Example 19 relates to the method of any of Examples 16-18, further comprising identifying plants more than a threshold distance off a centerline for each crop row.

In Example 20, a method for comparing as-planted data to post-emergence data, comprising: acquiring as-planted data from a field computing device; identifying planter rows for each implement pass; creating a point map of individual plant locations from collected images; assigning plants to a planter row and implement pass; determining any plants that are more than a threshold distance from a centerline of a planter row; and generating a distance between adjacent plants.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 13 is an exemplary dashboard showing plant data, according to one implementation.

DETAILED DESCRIPTION

Figure 1:
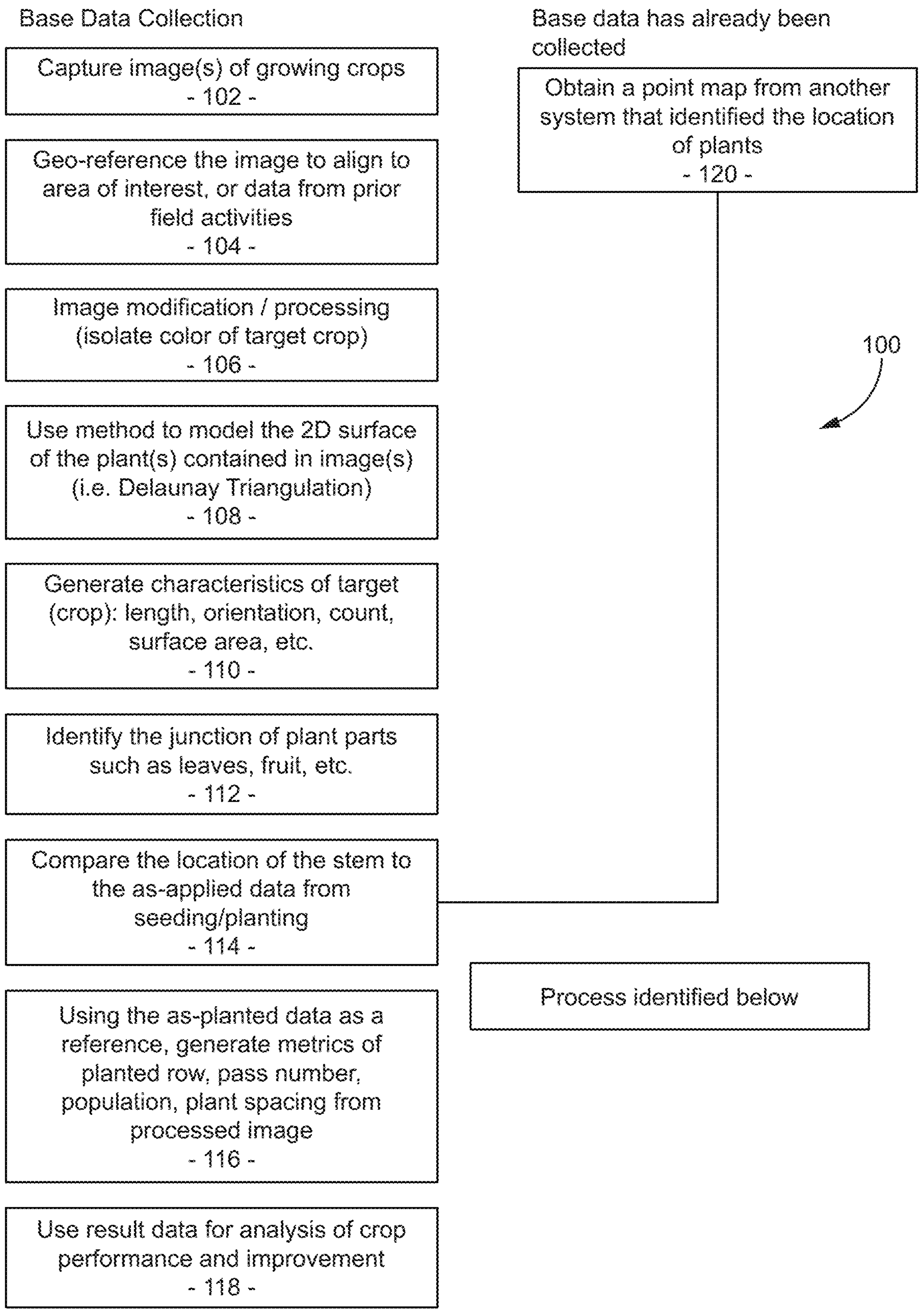
FIG. 1 is an exemplary flow chart showing a system process, according to one implementation.

The disclosed systems, apparatus, and methods relate to the evaluation of crop emergence and other characteristics via the processing of imagery, optionally high-resolution imagery. With the use of imagery, the disclosed system, apparatus, and methods are able to identify individual plants in a field, as well as various characteristics of those plants. The various characteristics of the plants can include leaf area, leaf length, and/or the number and placement of plants within a research plot, subsection of a field, or a whole field. This plant characteristic data can be merged with other agricultural map layers such as planting, derived analysis/machine learning data/layers, harvest stand counts, and other related data as would be understood. By combining various data points and imagery, the system, apparatus, and methods disclosed herein can quantify various agricultural analyses such as to better understand the relationship of the planted seeds, to the emerged plants, to the harvested plants. In various implementations, the imagery and/or other data is gathered in the early season, for example just after plant emergence.

The combined data and information from the system, apparatus, and methods described herein can be used to improve planting practices, improve seed genetics, and identify yield potential during the growing season based on measurements of a single or multiple geo-referenced image (s).

In conjunction with the described implementations, it is understood that a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. Pat. No. 11,277,961, issued Mar. 22, 2022, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 11,064,653, issued Jul. 20, 2021, entitled "Agricultural Systems Having Stalk Sensors and/or Data Visualization Systems and Related Devices and Methods," U.S. Pat. No. 11,297,768, issued Apr. 12, 2022, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 17/226,002 filed Apr. 8, 2021, and entitled "Apparatus, Systems and Methods for Stalk Sensing," U.S. Pat. No. 10,813,281, issued Oct. 27, 2020, entitled "Apparatus, Systems, and Methods for Applying Fluid," U.S. patent application Ser. No. 16/371,815, filed Apr. 1, 2019, entitled "Devices, Systems, and Methods for Seed Trench Protection," U.S. patent application Ser. No. 16/523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 15, 2019, entitled "On-The-Go Organic Matter Sensor and Associated Systems and Methods," U.S. Pat. No. 11,523,554, issued Dec. 13, 2022, entitled "Dual Seed Meter and Related Systems and Methods," U.S. patent application Ser. No. 16/891,812, filed Jun. 3, 2020, entitled "Apparatus, Systems and Methods for Row Cleaner Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed Apr. 19, 2022, entitled "Automatic Steering Systems and Methods," U.S. patent application Ser. No. 17/742,373, filed May 11, 2022, entitled "Calibration Adjustment for Automatic Steering Systems," U.S. patent application Ser. No. 17/902,366, filed Sep. 2, 2022, entitled "Tile Installation System with Force Sensor and Related Devices and Methods," U.S. patent application Ser. No. 17/939,779, filed Sep. 7, 2022, entitled "Row-by-Row Estimation System and Related Devices and Methods," U.S. patent application Ser. No. 18/081,432, filed Dec. 14, 2022, entitled "Seed Tube Guard and Associated Systems and Methods of Use," U.S. patent application Ser. No. 18/087,413, filed Dec. 22, 2022, entitled "Data Visualization and Analysis for Harvest Stand Counter and Related Systems and Methods," U.S. patent application Ser. No. 18/097,801, filed Jan. 17, 2023, entitled "Agricultural Mapping and Related Systems and Methods," U.S. patent application Ser. No. 18/101,394, filed Jan. 25, 2023, entitled "Seed Meter with Integral Mounting Method for Row Crop Planter and Associated Systems and Methods," U.S. patent application Ser. No. 18/102,022, filed Jan. 26, 2023, entitled "Load Cell Backing Plate and Associated Devices, Systems, and Methods," U.S. patent application Ser. No. 18/116,714, filed Mar. 2, 2023, entitled "Cross Track Error Sensor and Related Devices, Systems, and Methods," U.S. patent application Ser. No. 18/203,206+–, filed May 27, 2022, entitled "Seed Tube Camera and Related Devices, Systems and Methods," U.S. Patent Application 63/357,082, filed Jun. 30, 2022, entitled "Seed Tube Guard," U.S. Patent Application 63/357,284, filed Jun. 30, 2022, entitled "Grain Cart Bin Level Sharing," U.S. Patent Application 63/394,843, filed Aug. 3, 2022, entitled "Hydraulic Cylinder Position Control for Lifting and Lowering Towed Implements," U.S. Patent Application 63/395,061, filed Aug. 4, 2022, entitled "Seed Placement in Furrow," U.S. Patent Application 63/400,943, filed August 2022, entitled "Combine Yield Monitor," U.S. Patent Application 63/406,151, filed Sep. 13, 2022, entitled "Hopper Lid with Magnet Retention and Related Systems and Methods," U.S. Patent Application 63/427,028, filed Nov. 21, 2022, entitled "Stalk Sensors and Associated Devices, Systems and Methods," U.S. Patent Application 63/445,960, filed Feb. 15, 2023, entitled "Ear Shelling Detection and Related Devices, Systems, and Methods," U.S. Patent Application 63/445,550, filed Feb. 14, 2023, entitled "Liquid Flow Meter and Flow Balancer," U.S. Patent Application 63/466,144, filed May 12, 2023, entitled "Devices, Systems, and Methods for Providing Yield Maps," and U.S. Patent Application 63/466,560, filed May 15, 2023, entitled "Devices, Systems, and Methods for Agricultural Guidance and Navigation," each of which is incorporated by reference herein.

Turning to the figures in more detail, FIG. 1 shows an exemplary workflow/steps for crop identification. In a first optional step, the system 100 captures images of growing crops (box 102). As would be appreciated, when crops are small (such as <10" tall) there is enough leaf material above ground that taking an image above the ground such as by drone, aircraft, handheld camera, autonomous vehicle, vehicle mounted platform, or the like over the field can capture an image that is able to be processed to identify individual plants within the image. Once plants that are larger it may be more difficult to identify individual plants within an image because the leaves/plant bodies are large enough to begin to overlap.

In various implementations, a single image may show around 2-4 acres but as will be described further herein multiple images can optionally be put together (stitched) to form a larger map/image. The area depicted in an image may vary depending on the type of platform from which the image is acquired. For example, aerial platforms are likely to capture a larger area in a single image when compared to a ground-based platform that will likely image a smaller area from a closer distance. For ground-based platform—handheld or vehicle/implement mounted—captured images, the captured area per images can be a linear row or rows, or a small area of interest.

Figure 2:
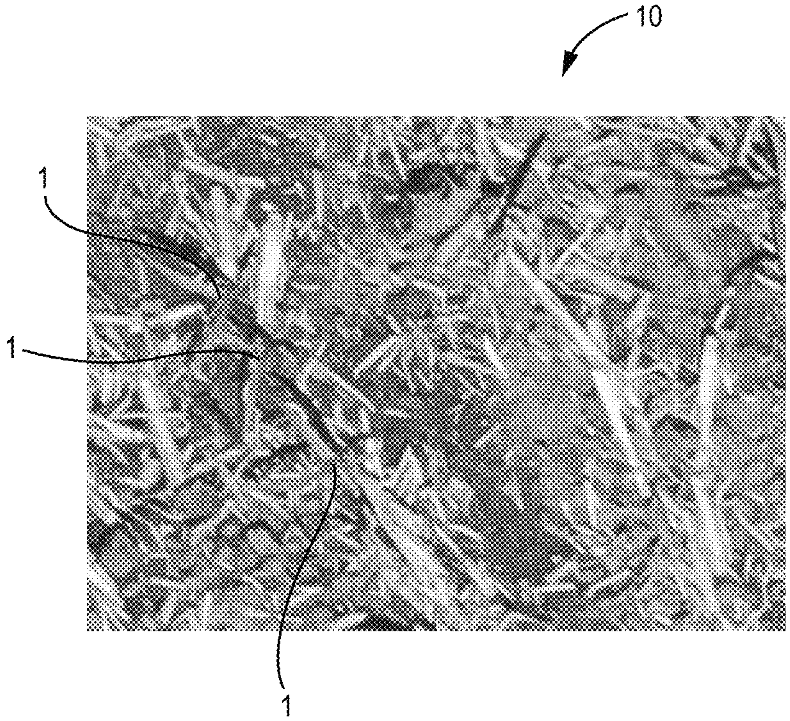
FIG. 2 is an exemplary stitched or single overhead image, according to one implementation.

After images are captured, they may optionally be stitched together to form a single scene or mosaic of multiple combined images. One exemplary stitched image 10 is shown in FIG. 2. Optionally, these images are a high-resolution images, 0.1 to 2 cm/pixel, and optionally about 0.5 CM/pixel. Such high-resolution imagery may be needed to have sufficient clarity to conduct the analyses described herein.

Turning back to FIG. 1, in a further optional step, the system 100 can then import the imagery into a mapping program (such as Agfiniti® or SMS Advanced® from Ag Leader®) to do additional diagnostics of the imagery. For example, the imagery may be geo-referenced (box 104) or otherwise integrated with other data from prior field activities (box 104). In certain implementations, the imagery is imported or otherwise processed to align the imagery with a location in the field where the planter or other machinery has operated.

Figure 3:
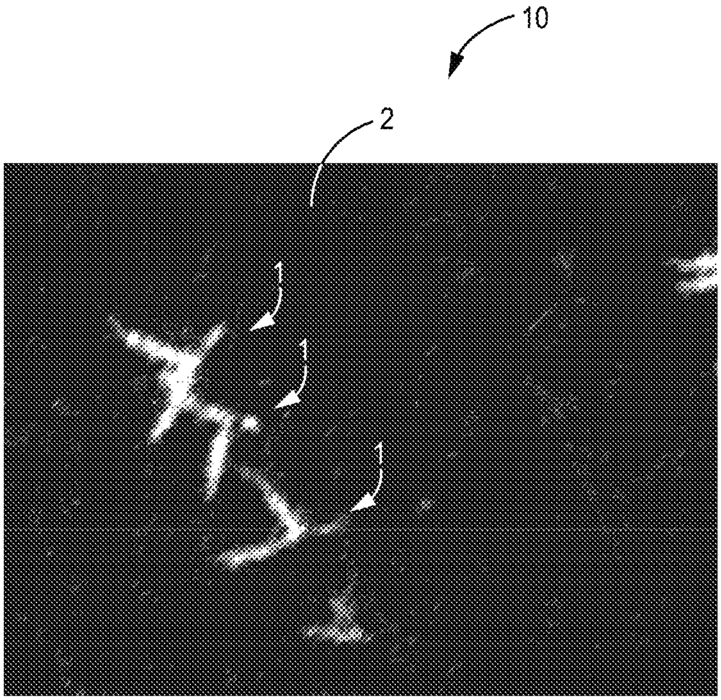
FIG. 3 is the image from FIG. 2 adjusted to increase contrast between plant pixels and background pixels, according to one implementation.

In various further implementations, the imagery can optionally be manipulated/modified in various way to improve/enhance processing (box 106). In one exemplary implementation, the imagery is modified to improve the contrast to the remainder of the field (bare soil, previous crop residue, tire tracks etc.) to the growing plant, shown for example in FIG. 3 where the black and white image highlights contrast between the soil/debris 2 and the plant of interest 1. In this example, the imagery was modified by converting the image (such as the image 10 shown in FIG. 2) using a method of a scale factor multiplied by subtracting the red band of the image from the green band. This resulted in the rest of the color of the image being removed, and the white silhouette of the plant 1 remaining.

In another example, the imagery can be modified to improve contacts via certain image processing techniques such as via the use of normalized difference vegetation index (NDVI) with an NIR equipped camera or similar. In these implementations, using the formula NIR−R/NIR+R will isolate the green plant material for use as described herein. Various alternative methods and processes for enhancing contrast are possible and would be recognized by those of skill in the art.

In certain alternate implementations, the target plant/fruit color may not be green and as such different processing to isolate color to the target crop, for enhancing contrast may be needed. If the object that the user is trying to isolate is a different color than green (e.g. pumpkins in a pumpkin patch/orange), the system 100 or user is able to define and use a different formula to allow the desired color to be isolated from the non-desired or non-target color(s). These changes to the formulae would be recognized by those of skill in the art.

Other image improvements to isolating the plant in the image from the rest of the non-plant items can optionally include adjusting the hue, saturation, and/or luminance to make a greater difference in the plant 1 and non-plant 2 areas. In several of these approaches, the brightness and/or scale of the image can be adjusted for better results/make target plants 1 more pronounced and easier to identify the edge of the plant 1 and/or plant leaves.

Other methods to identify the plant include machine learning where the shape and color of the plant are identified by comparison to sample images of the same type of plant. For example, a machine learning algorithm can match the shape and orientation of the leaves to another image that was used as a sample in training the program. Various alternative method and process for application of machine learning are possible and would be recognized by those of skill in the art.

Figure 4:
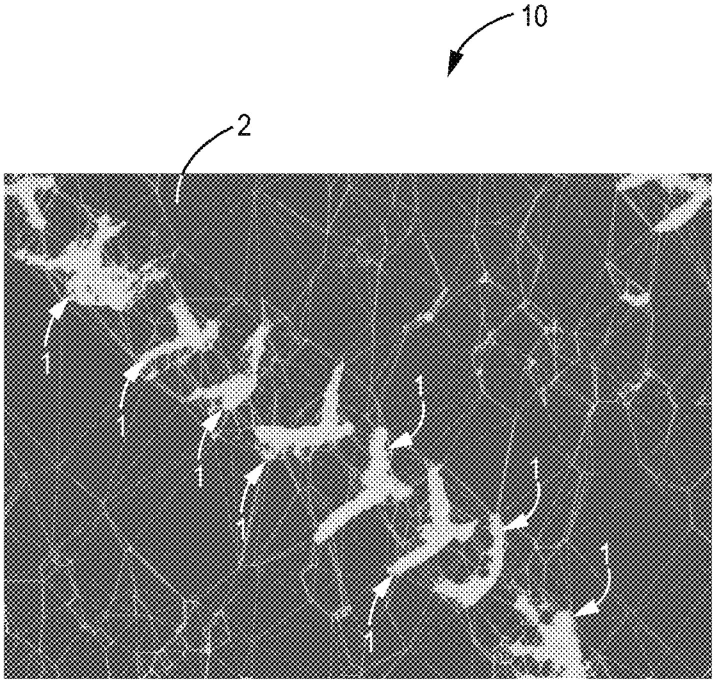
FIG. 4 is the image from FIGS. 2-3 overlayed with triangulation, according to one implementation.

In various implementations, when the individual plants 1 are identifiable by the system 100, with or with modification/processing (box 106), the system 100 can analyze individual plants 1 such as by modeling the surface (box 108). In one optional step, the entire image 10 may be covered with a triangulation routine such as a Delaunay Triangulation. Triangulation is used between the pixels identified to be plants that are defined as a target color (green) that after processing may be white or other contrasting color. Lines connecting leaf edges on the same plant 1 will be shorter than lines that were connected between different plants 1—encompassing the background 2, as can be seen in FIG. 4.

Utilizing the pixels of the image 10, triangle with more than a threshold of the number of pixels between corners of the triangle are to be removed. For example, if there are more than a threshold number of pixels (e.g. >6) between two corners of the triangle, the triangle will be removed from the image because it is identified as being a non-plant/background 2 area. The shorter lines that have fewer than the threshold number of pixels (e.g. 6 pixels) that remain in the image are identified as those that cover the plant 1 leaf, and these are the areas of the plant 1 visible in the picture/image 10.

Figure 5:
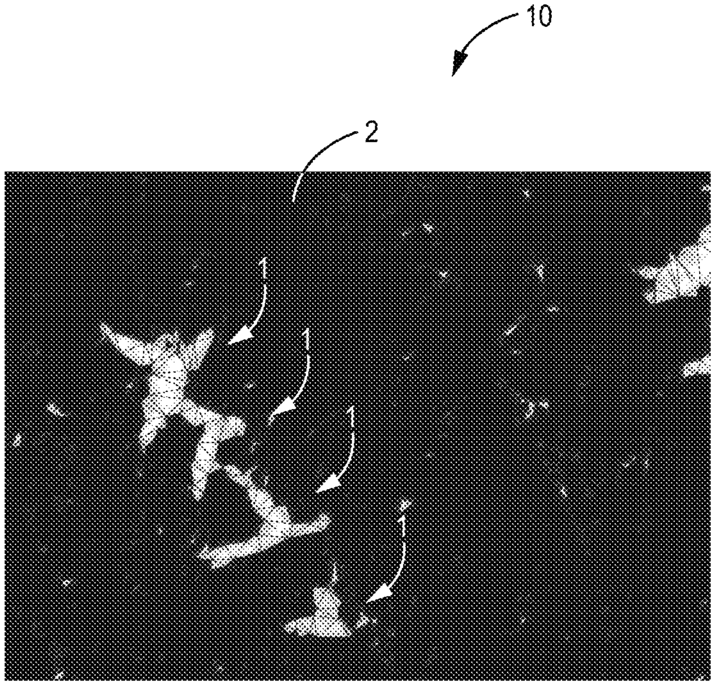
FIG. 5 is the image from FIGS. 2-4 with the background pixels removed, according to one implementation.

FIG. 5 shows an exemplary image 10 where the non-plant/background 2 pixels (those triangles with a side greater than the threshold size) are removed leaving only the plant 1 pixel 2 (those triangles with sides of smaller than the threshold size). Using this approach, the edge of a plant 1 is digitized, and the system 100 can identify the difference between soil, residue, (background 2) and living plants 1.

In various alternative implementations, the system 100, or user identifies a measured distance between the corners of the triangle and that is used instead of or in addition to the number of pixels between corners of the triangles to remove the space between plants or leaves of the same plant.

Figure 6:
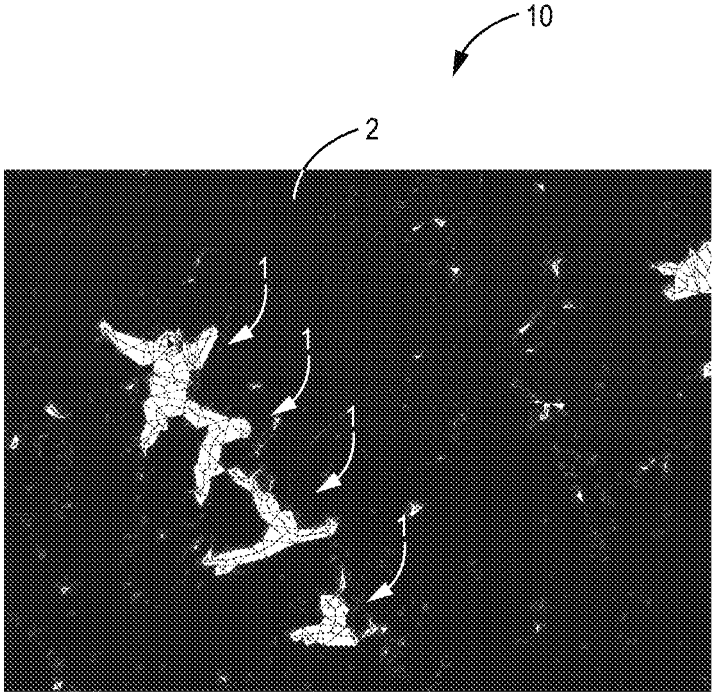
FIG. 6 is the image from FIGS. 2-5 with lines connecting the central point of each of the triangles of plant pixels, according to one implementation.

Turning back to FIG. 1, in a further optional step, the system 100 can quantify various characteristics of the target crops (box 110). For example, to estimate length of a leaf or several leaves, the center of each of the generated triangles is identified and a line is connected through all the centers of the triangles, shown for example in FIG. 6. By connecting the center points of each triangle to the system 100 can estimate the length of an individual leaf or several leaves of a plant 1 that may go in different directions from the stem 3. This allows the system 100 can use the estimated length of the leaves as a filter for other processes, as will be described further herein and as would be appreciated.

Figure 7:
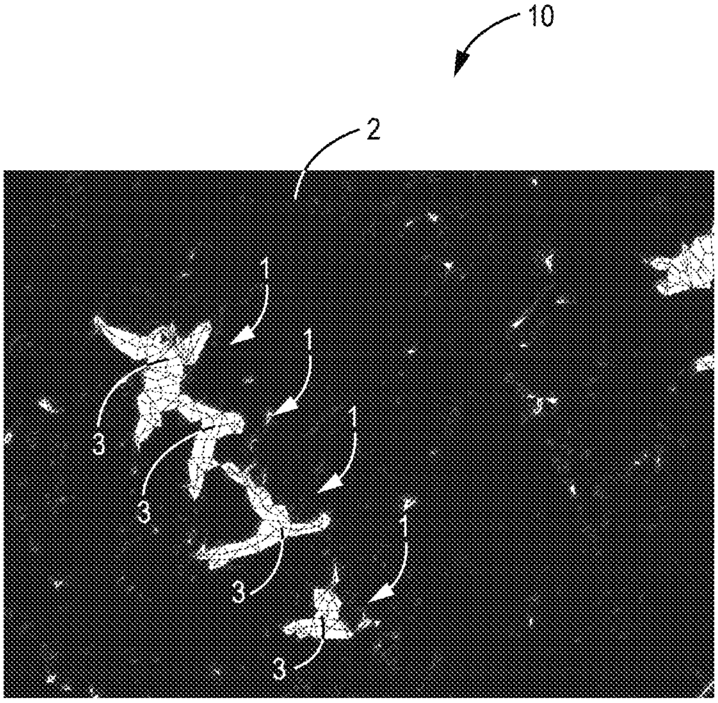
FIG. 7 is the image from FIGS. 2-6 with the central portion or stem of each plant identified, according to one implementation.

In various implementations, the system 100 can estimate the location of the plant stem 3 as the location where several of the connecting center lines come together and form a "Y", or junction (box 112), as seen in FIG. 7. In various implementations, the system 100 uses the stem 3 locations to identify individual plants 1, and create a spatial location and count for each plant 1. At this location, the system 100 can optionally place a spatial dot 3 at the junction to define where the plant 1 is compared to other plants 1.

As would be understood, the spacing between plants, and where the leaves of neighboring plants touch each other, can impact the ability to identify an individual plant. With imperfect spacing of plants, which is typical from most planters, the spacing can be variable, where 2 plants may be 3" apart, and the next 2 plants might be 8" part. By using a minimum distance filter between estimated stem 3 location points, the system 100 can account for some of this variability. As an example, using a 3" plant spacing filter, if a junction 3 is more than 3 inches away from the previous plants 1 junction 3 the system 100 identifies two different plants 1. If the junctions 3 are closer than 3" the system 100 may assume there is only one plant 1, and for example the orientation of the plant 1 leaves may have made it appear that there were two plants 1 on top of each other, when in fact there was only one plant 1.

By repeating some of these processes through the image(s) 10, the system 100 can classify each plant 1 and determine the average leaf length. Taking an average of the length of the longest two branches off the junction 3, mentioned above. In various implementations, the system 100 can classify the size of the plant 1 and tag each plant 1 location with the leaf length for use by the system 100.

In certain implementations, the system 100 can classify the length of a leaf into a crop growth stage, and/or into a user or system 100 defined range. For example, a leaf length from 1.3" to 2" is a 'V1' stage and from 2" to 3" is a 'V2' crop stage, and so on, as would be understood.

Figure 8:
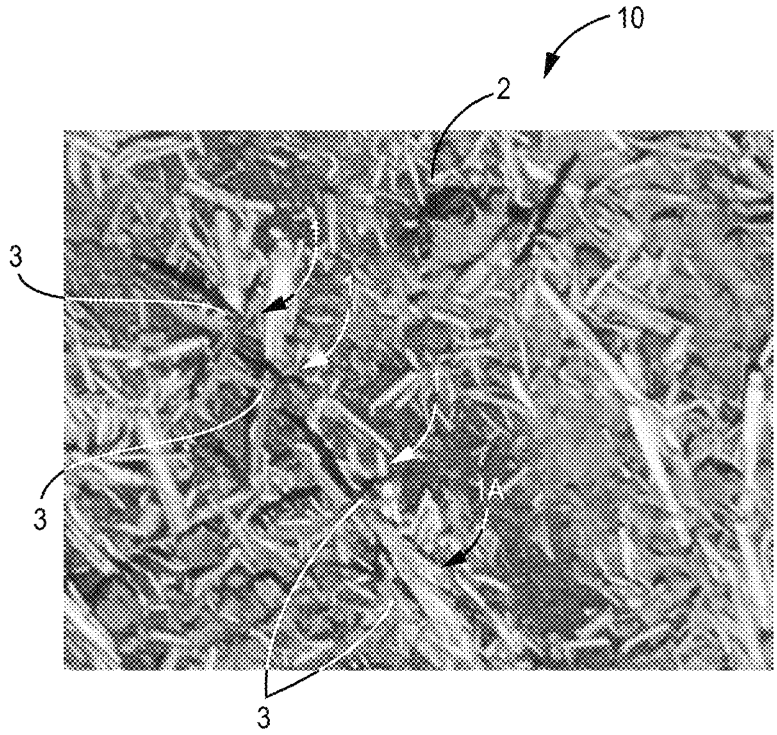
FIG. 8 is the image from FIG. 2 overlayed with the data from FIG. 7 showing the central portion or stem of each plant on the unprocessed/stitched imagery, according to one implementation.

In some crops, such as corn, the yield is impacted by how evenly the plants emerge. At an early stage of emergence, the difference in plant size is apparent enough to make a determination of a late emerged plant versus a plant that came up with the majority of the rest of the field. FIG. 8 shows an image with plant junctions 3 layered over the complete imagery 10, in this figure the difference in size between a late emerged plant 1A and an on-time plant 1 is evident. As would be understood a plant 1A that came up or emerged about 36 hours after the adjacent plant 1 (a late emerged plant 1A) will often not produce a harvestable ear, as it will always be shadowed by the first to emerge plant 1.

Figure 9:
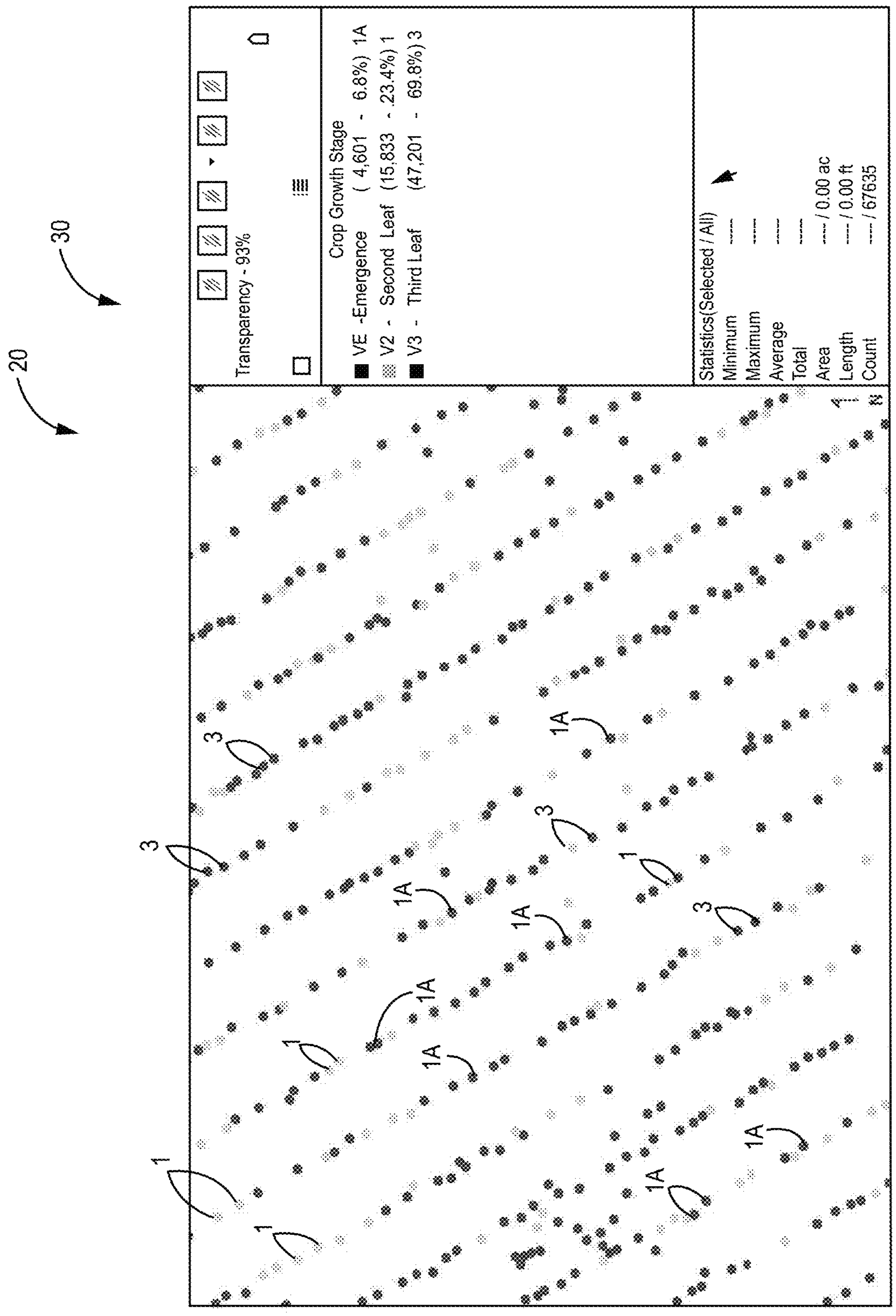
FIG. 9 is an exemplary dashboard showing categorization of measured plants, according to one implementation.

FIG. 9 shows an exemplary dashboard/display 20 image of crop/plant 1 locations coded by their estimated growth stage. The point map 30 displayed on the display 20 of FIG. 9 maps the junctions 3 of the plants 1 to a geolocations. In various implementations, the system 100 can review the image selection in one scan looking for larger plants (normal growth stage plants 1), and then another scan to look for smaller plants (late emerged plants 1A). In various implementations, a user can see a map of the large plants 1, a map of the large plants 1 and small plants 1A together, and/or a map of solely small/late emerged plants 1A. In various implementations, the system 100 can then estimate how many plants exist in the sample that are late emerged plants 1A. By knowing the number of late emerged plants 1A, a grower can know the number of plants 1A that will likely not produce a harvestable ear, and thus be less profitable compared to all plants 1 emerging on time/in the same defined period such as about a 24-36 hour period.

In some implementations, the system 100 may gather image data over several days or more than once separated by about 36-72 hours or more as would be understood. The time between collection of imagery can vary depending on crop type, weather, and other conditions as would be understood. The imagery from the first collection and the imagery from a second or subsequent collection can be compared and the triangulated leaf area from the two collection of imagery, to compare the amount of plant growth between the collection times. In various implementations, the imagery and data therefrom can be visible as multiple layers in a single map, as would be understood. This type of analysis can be helpful in realizing the efficiency of plant growth during a known weather environment, which can be helpful in ranking plant genetics that will grow better under adverse conditions. This is in addition to the ability to compare the normal plant stand and confirm that the plant stand found in a first collection is close or matches the plant stand in a second collection.

Turning back to FIG. 1, in another optional step after generating the spatial map of all the points in the viewable area from the imagery, the system 100 can then compare/analyze the imagery based on as-planted information (box 114), such as data that that was recorded with a GPS, field computer, and/or other plating system as would be understood. The alignment of the points from the imagery representing emerged plants to the as-planted data recorded by a field computing device can then quantify the number of plants that came from each row, pass, as well as populations, plant spacing, and other data as would be understood (box 116). By quantifying this data, a grower can better understand and quantify the quality of emergence by pass or row of the planter. This helps alert a grower if there is a repeatable situation where they need to make repairs or adjustments to the planter or other equipment to do a better job and improve yield in the future (box 118).

Figure 10:
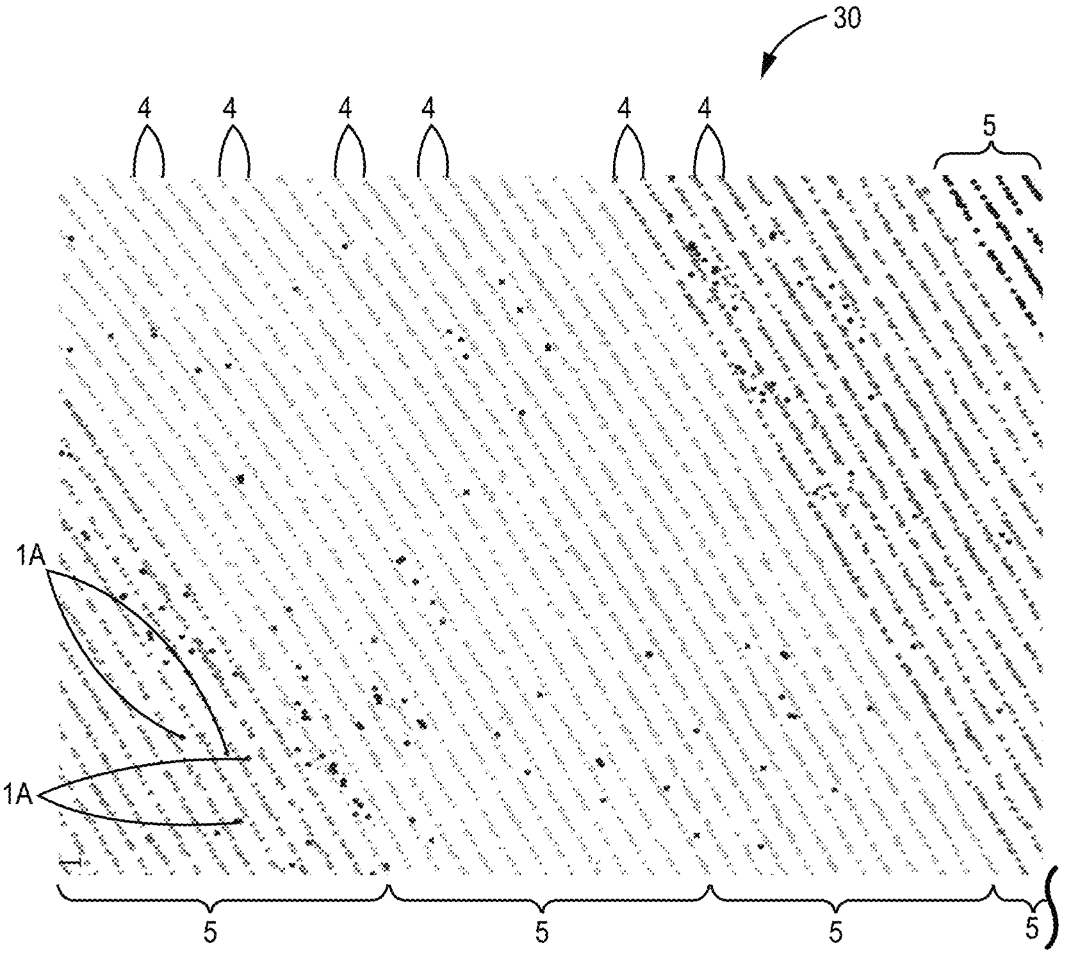
FIG. 10 is an exemplary image of a field showing plant locations, according to one implementation.
Figure 11:
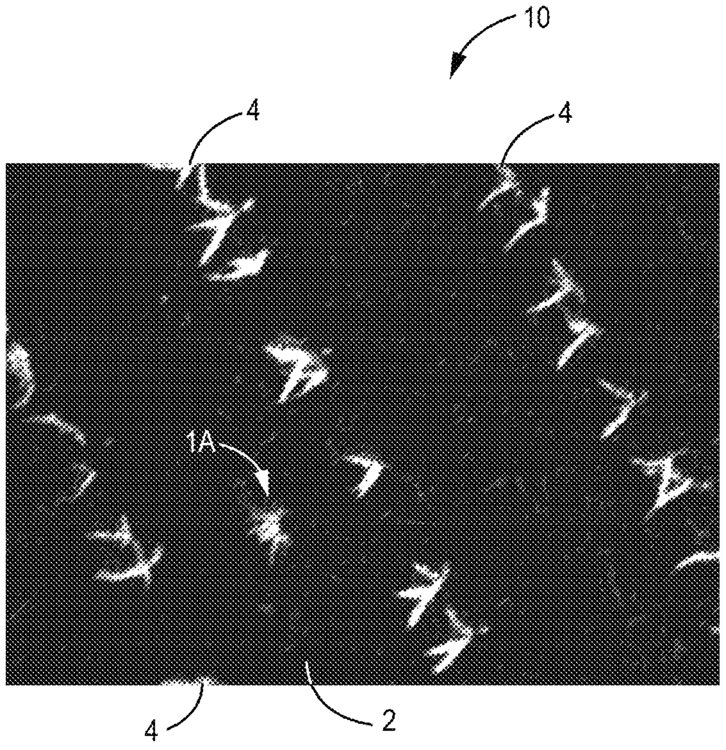
FIG. 11 is a processed overhead image showing a volunteer plant between the planted rows, according to one implementation.

In a further example, with having a comparison to the planted data, conclusions to the quality of seed metering (seed spacing) can be identified. Having erratic spacing can equally damage yield potential even if they emerge at the same time. The closer plants are to each other, the root systems will need to compete for water and nutrients in the growing season. As can be seen in FIG. 10, overlapping data layers can show a comparison of rows 4 to each other as well as rows 4 on different passes 5 (each section represents a different pass 5). Further the system 100 can highlight or otherwise flag plants 1A that are more than a threshold distance outside a row 4, such as 6" or more. The system 100 can then identify these plants 1A as possible volunteer crops or weeds. FIG. 11 shows imagery 10, with adjusted contrast (such as that described above in relation to FIG. 3), showing a volunteer plant 1A between two planted rows 4.

As noted above, during the process of identifying the plants, a measurement of the leaves can help determine size compared to the neighboring plant. This is important to see the number of late emerged plants as they are more likely to not produce a harvestable ear. By measuring all the plants, and then assigning the length of each leaf to each plant, the system 100 can then create a map layer that shows the size of each plant, and then can categorize plants by grouping them in a growth stage to present to a producer. This allows the producer to see at a glance how many plants are behind a growth stage, and subject to a risk of not producing a harvestable ear. This would likely trigger the grower into inspection of planting equipment for maintenance, upgrading parts, and/por changing planting practices based on weather/soil conditions that lead to uneven emergence to improve the evenness of emergence in future years. In some implementations, a producer may also be able to see how even the plants are after improvements as well by comparing imagery year over year or between passes where changes are made. Other possibilities could include that some plant/seed varieties have different genetics for emergence, compared to others, such that the system 100 may allow for comparison or evaluation of genetics/plant characteristics between seed varieties. That is, if no mechanical adjustments were made to the planter, but the plant/seed variety changed, a difference in emergence or other characteristic may be attributed to plant genetics. This data may allow a grower or the system 100 to evaluate and trigger different selections of seed varieties in future years to achieve more even emergence/higher overall yield.

Furthermore, some images that are captured will show that a plant is between the rows of a planted crop such as volunteer crop or weeds, shown in FIG. 11. For example, as would be understood, in fields that are planted to corn after the previous season was also corn, there is a chance that some of the previous crop will land on the ground during harvest and emerge along with the new crop the following growing season. These are often called volunteer plants, that were not intended to be a part of the new crop. If there is enough volunteer crop, the volunteer crop can affect the overall yield of the intended crop and/or attract unwanted pests. By comparing where these plants are, the system 100 can estimate how many additional plants are in the field and how they may impact the season and optionally if remediation steps are warranted/necessary. In one example, if too many volunteer plants are in the field, the grower may elect to apply more fertilizer to help ensure that all plants have enough nutrients to generate profit/improve yield. In some implementations, the system 100 can identify the color of the plant to determine if the plant off the planted line is a weed and not a volunteer crop. If excessive weeds are present a grower may elect to apply additional herbicide. As would be understood, a weed can be a competing plant that may impact yield.

As would be understood, geo-referencing images from a drone is not always spatially accurate. Generally, the images are accurate to within a few feet or less to the true position of the objects they capture. With reference information from planting, in season applications, and/or harvest data that was collected with an accurate GPS receiver such as sub-inch RTK receivers, the imagery can be adjusted in any direction to the spatial positions/passes where data was collected (box 104). This allows the option to improve the alignment of the imagery to where the data was collected spatially. Conversely, if the accuracy of the planting or other data is poorer than the image, that data could be adjusted to match the image as well (box 104). Some outside factors that would create some of this error could include slope of the field (a flat image rendered from a curved surface), angle of a downward looking camera that was not completely vertical due to wind, or other forces that are understood to effect camera orientation.

Figure 12:
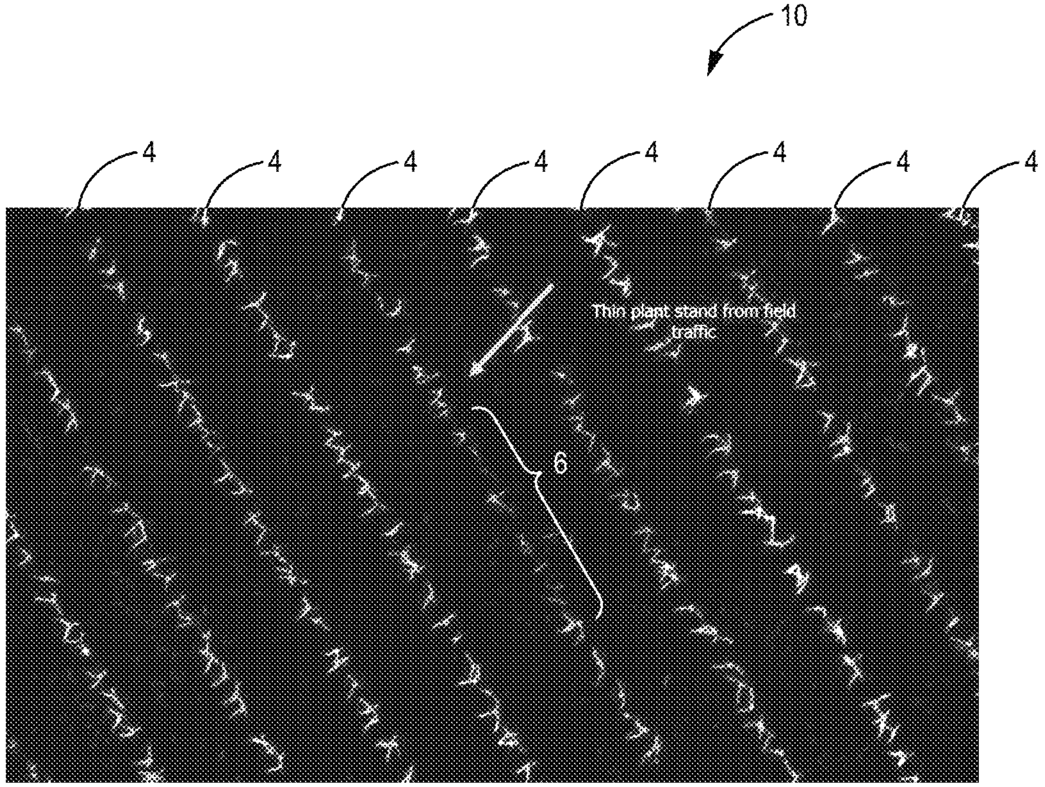
FIG. 12 is a processed image showing plant locations and areas with a thin stand due to implement/vehicle traffic, according to one implementation.

In some cases, a missing plant or several missing plants in close proximity to each other may imply that field traffic caused some of the stand loss, as seen in FIG. 12. Here, the section 6 of a row 4 has a number of missing plants 1. This may lead to needing to generate an application plan to apply a chemical to these areas to prevent weeds from growing and thus effecting surrounding crop. In many cases the imagery that is collected will result in less than a 1 cm/pixel resolution. With this accuracy it is often possible to see evidence of a tire track from a machine driving in the field. Generally, the grower will try to drive between crop rows to avoid damage, but it is not always a guarantee that they will accomplish this. As such it is a strong possibility that a vehicle may at some point will accidentally drive over the crop that is intended to be harvested. The imagery can be used to see that there is a reduction in crop, as noted by the absence of plants, as well as note that when a tire pattern drives into that same area in the image, that the cause of those plants to be missing is due to field traffic.

With the imagery, and the ability to document the same plant a few days apart from each other, it is also possible to see changes in the color of the leaves. During the early growth period of a plant, it is generally expected that as more leaves become larger and convert more sunlight to chlorophyll to continue to grow. If during a first collection pass, and then confirmed in a second collection pass that there is an area within the image that is not as healthy as the first image (due to pale green color, or variable coloring to leaves spots, lesions, holes, or plants that have died) a grower could assess the percentage of change, and take action if able to reverse the damage, or limit the damage. These actions could include fertilizer applications, or pesticide applications to solve an issue that is damaging their crop and improve profitability.

By looking at the amount of area covered by a plant leaf, and how much soil area remains visible to the sky, the system 100 and/or a user can assess the plant canopy in the field with a high degree of accuracy. The importance of plant canopy in agriculture is to reduce opportunity for weeds to compete with the growing crop. One of the ways this is done is by shading out the soil by the desired crop to prevent weeds from being able to capture sunlight and competing with the crop. By observing an area multiple times and comparing the growth of individual plants, the system 100 could estimate the time remaining until the crop achieves a certain level or percentage of canopy. Or by contrast, if the crop never gets to canopy, the system 100 can then estimate how much open area still exists.

The system 100 and methods described herein are able to count plants in a quick and accurate manner over a large area of a production/research/test field to provide information to a grower, as discussed herein. Images and map layers collected early in the season can be compared to other counting methods as well. The emerged stand early in the season is a good indicator, but the final stand is generally considered what will make a good or poor crop. The emergence data from early in the season can also be compared with harvest sensors. This would provide further evidence of what was counted early in the growing season and a comparison of what was harvested at the end of the growing season. This comparison can assist in determining at what point in the season and issue was encountered effecting yield.

As noted above, known solutions for evaluating plant emergence and early plant characteristics are time consuming and prone to human error. Using an imagery-based approach described herein allows the grower to quickly look at multiple rows, and multiples segments of the same row to identify trends and areas of concern that the grower can go back to the field and the ground truth or inspect the planter for issues that would contribute to the issues they found. FIG. 10 and FIG. 13 show exemplary dashboards 20 displaying data from image collection and processing including the number of plants per row, population, seed spacing, volunteer plants (shown at the −1 row) and other data. Often without the disclosed system 100 those mini-trends would go undocumented and unresolved potentially costing revenue to the grower due to yield reduction in future years as well as the current year.

Another advantage of using such an image-based approach is that it provides a repeatable process for counting the same area of the field multiple times if needed or looking back over time to see if the emergence has changed over that period of time. This is especially true in the early season when there are plants emerging at different times, the stand changes so what was counted as 30,000 seeds/acre in week one may turn into 33,000 seeds/acre in week two. Having an image of the area of interest can validate that there were 3,000 more plants in the same location in the field than the week later. This can also help in times of a dispute between a grower and a provider of the seed/fertilizer/crop treatment when there is a reduced count in a portion of the field compared to a second area of a field without the same treatment.

As noted above, there are a number of known drone systems that will provide an estimate of plant stand for a whole field in coarse resolution. In some cases, these known drone systems will fly an 80-acre field, and the drone will stop over 80 spots in the field and capture a single or limited number of images, and then move to the next spot. With these prior systems there is a count of the emerged stand at that time, but there is no reference to what rows were captured, or what size of plants were present, or if there were plants that were volunteer corn, or weeds in that same scene. As such, the disclosed method provides more ground truth to what is present in the field for a harvestable crop. Other methods will show a similar point map, but will have no intelligence as to which row each plant was from, nor does it show the leaf surface area, growth stage, etc.

The disclosed system, apparatus, and methods can give a grower geo-located proof of the stand and surrounding metrics that are not possible by counting plants manually. Should there be a question of how plants emerged at the end of the growing season, this could be proof of what was in a specific spot that is dated, photographic, and spatially located evidence.

Figure 14:
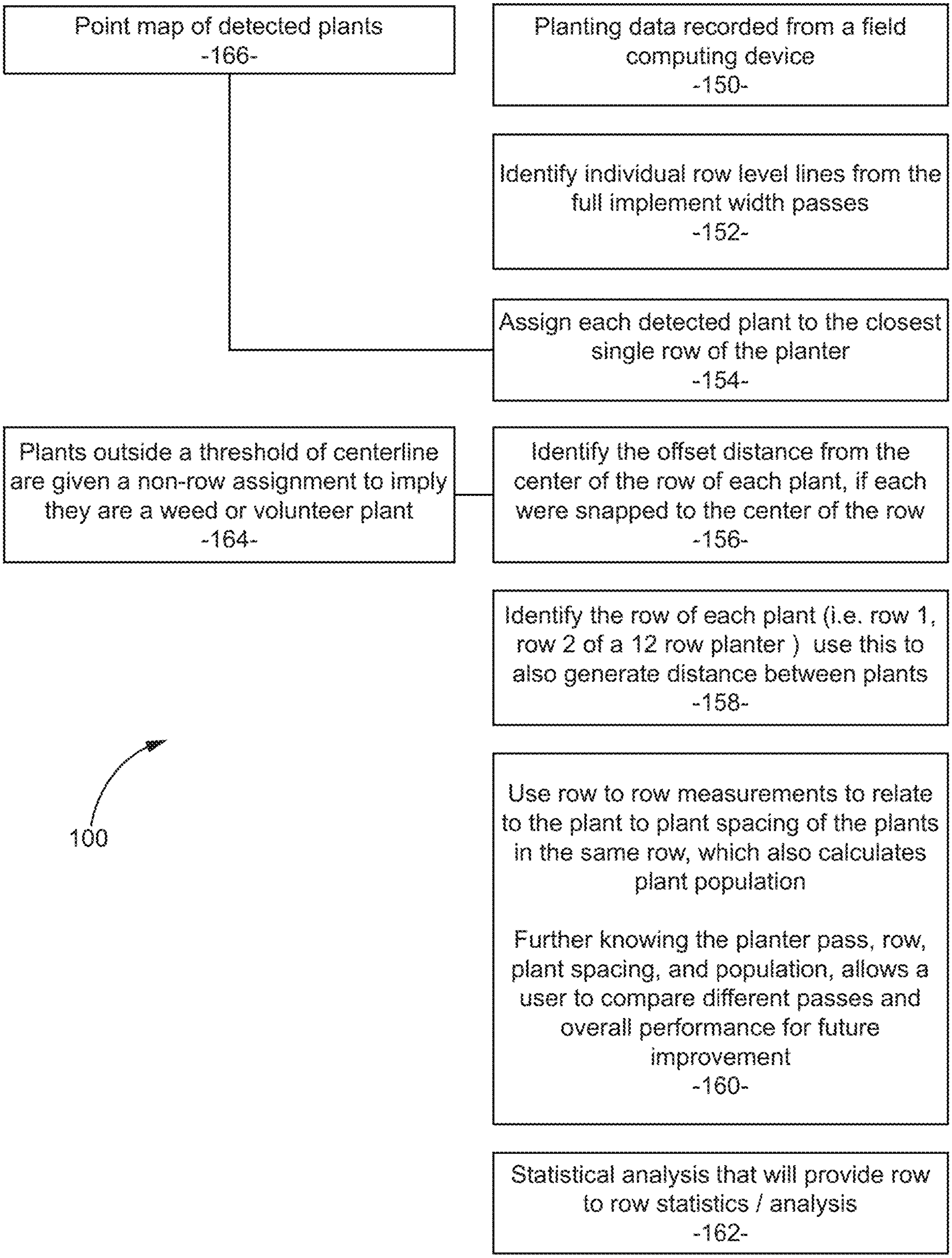
FIG. 14 is a flow chart showing a system process, according to one implementation.

FIG. 14 shows a further alternative system 100 process. In one optional step, planting data is recorded from a field computing device (box 150). That is, planting data recorded by the planter and/or on-board systems (including seed metering sensors and GPS receivers) are obtained by the system 100, such as downloading from a cloud server. Alternatively, the system 100 may operate on the same display/computer used to record the planting data.

In a further optional step, individual row level lines from the full implement width passes are identified (box 152). In these and other implementations, the system 100 identifies the individual rows for each planter pass, optionally matching rows planted by a particular row unit between passes.

In another optional step, the system 100 creates a point map of detected plants (box 166), discussed in further detail above. The system 100 can then assign each detected plant to the closest row (box 154). The system 100 may also optionally identify an offset distance from the center of the row for each detected plant (box 156). In some implementations, plants outside a threshold distance from the row may not be assigned a row and instead to labeled as a volunteer plant or weed, as appropriate (box 164).

In another optional step, the system 100 can identify the row for each plant (the row unit on the planter that planted the seed) (box 158). Additionally, the system 100 can identify the planter pass for each plant and row. In various implementations, this row and pass data can be used to determine the distance between plants.

In a further optional step, the system 100 can use row to row measurements to determine plant to plant spacing for plants within the same row (box 160). Additionally, or alternatively, the system 100 can determine plant population. Further, optionally, the system 100 can compare different passes and overall performance from the data (including but not limited to planter pass, row spacing, plant spacing, and population) for optional future improvement and/or remediation steps (box 160).

Additionally, the system 100 may automatically or semi-automatically perform various statistical analysis for individual plants, rows, planter passes, test plots, whole field, and the like, as would be understood (box 162).

Figure 15:
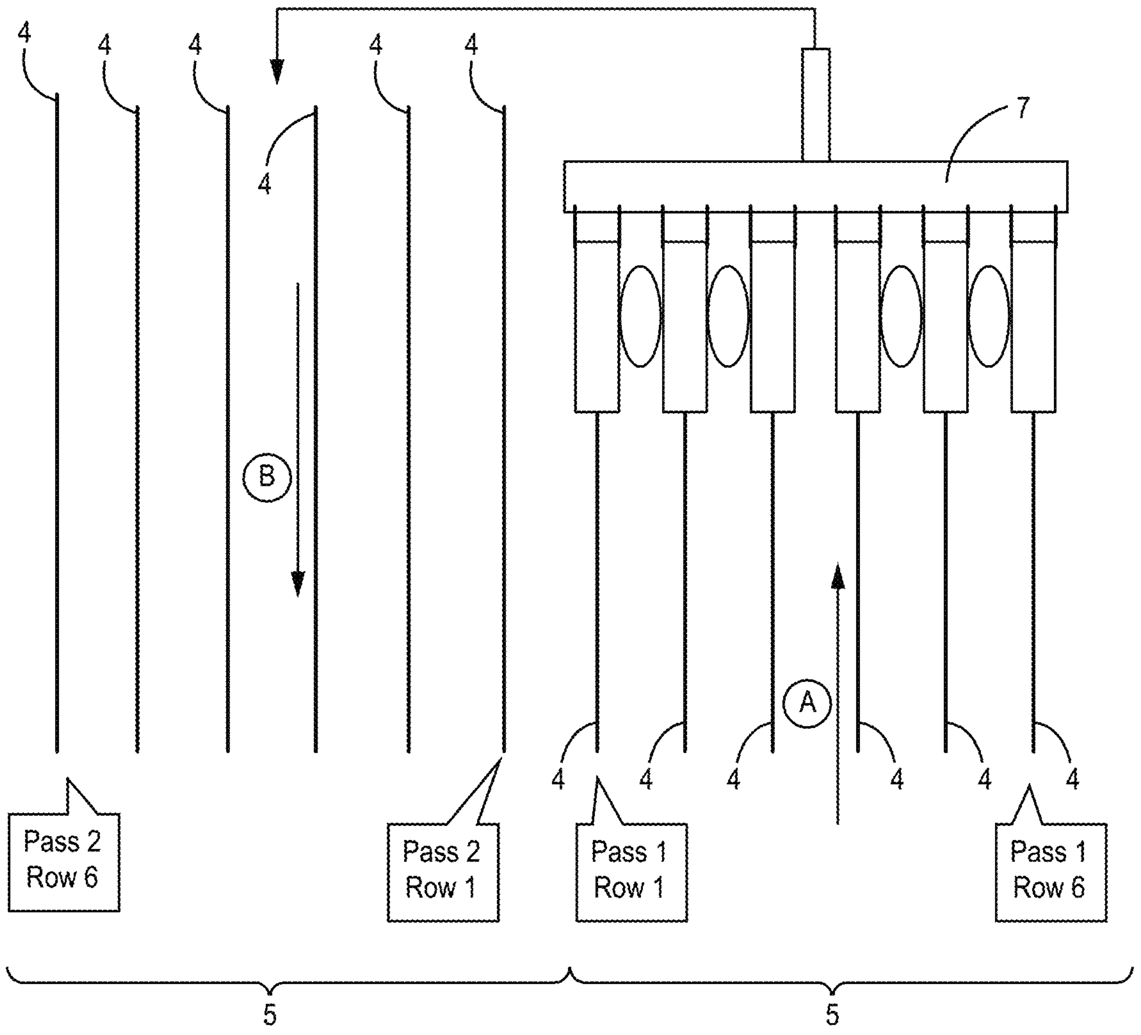
FIG. 15 is a schematic depiction of as-planted data, according to one implementation.

In some implementations, the collected imagery data is compared to as-planted information. FIG. 15 shows as-planted passes 5 for a 6-row planter. The arrows (A and B) indicate the direction of travel as the planter 7 traverses across the field. As the planter 7 transitions between passes 5 the planter 7 makes an effective u-turn, the result being row 1 of a first pass being adjacent to row 1 of the second pass. As would be appreciated this is the pattern during standard operation of a planter 7 but deviations can exist due to field shape and obstacles, creating a random pattern. An as-planted map can detect and record the planting pattern to future map layers and analysis.

Figure 16:
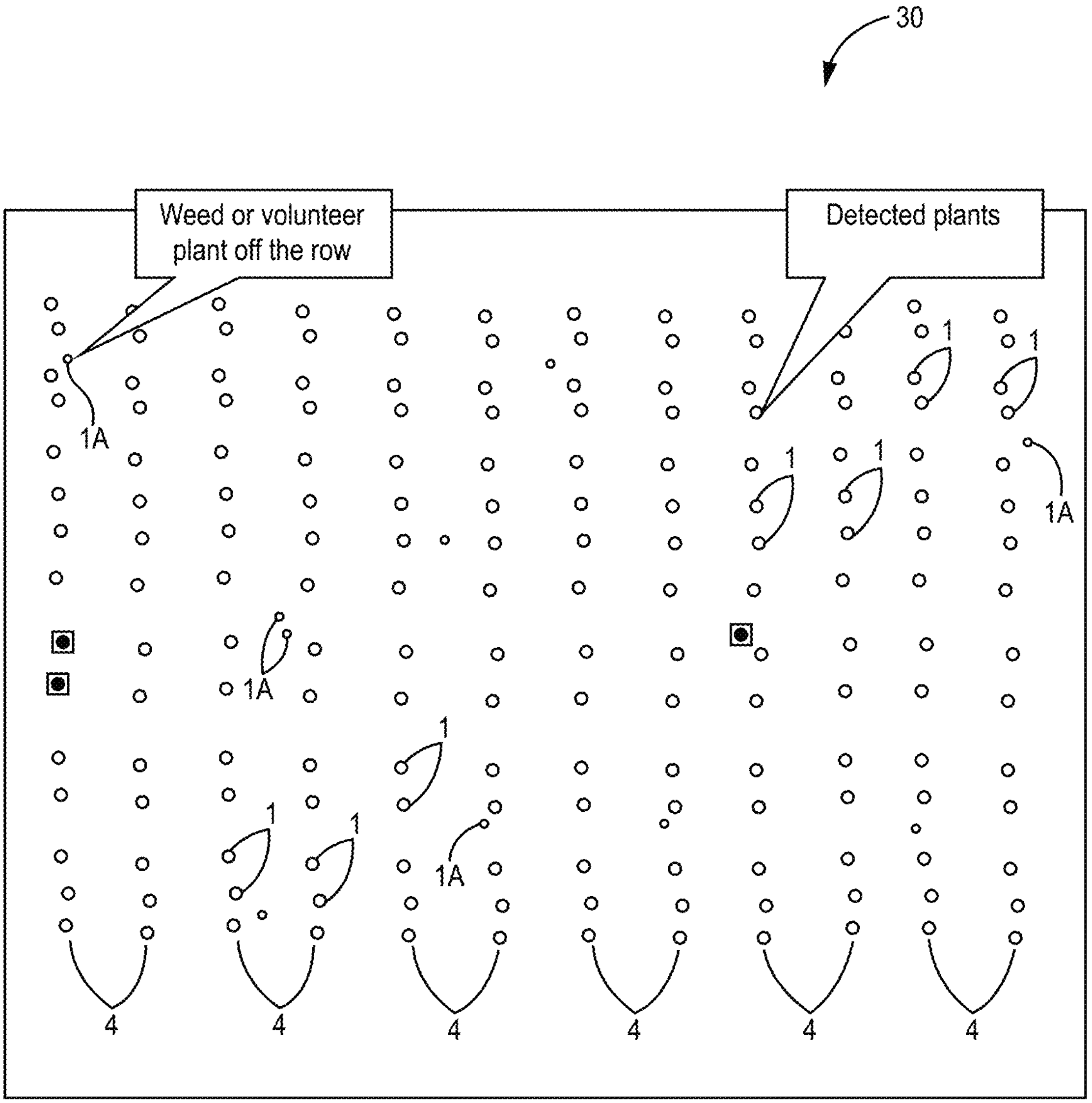
FIG. 16 is a depiction of plant locations with weeds/voluntary crops, according to one implementation.

FIG. 16 shows a point map 30 for plant 1 locations from an image. The point map 30 may be generated as discussed above. As can be seen, plant 1 locations are generally within a row 4, with some deviation from center due to how the plant 1 pushed through the soil surface during emergence and slight variation caused by planting. In this image of FIG. 16 there are ten (10) locations where a plant 1A is detected that are more than a threshold distance from the center of the row 4—not aligned with the row 4—that may be a weed or volunteer plant 1A.

Figure 17:
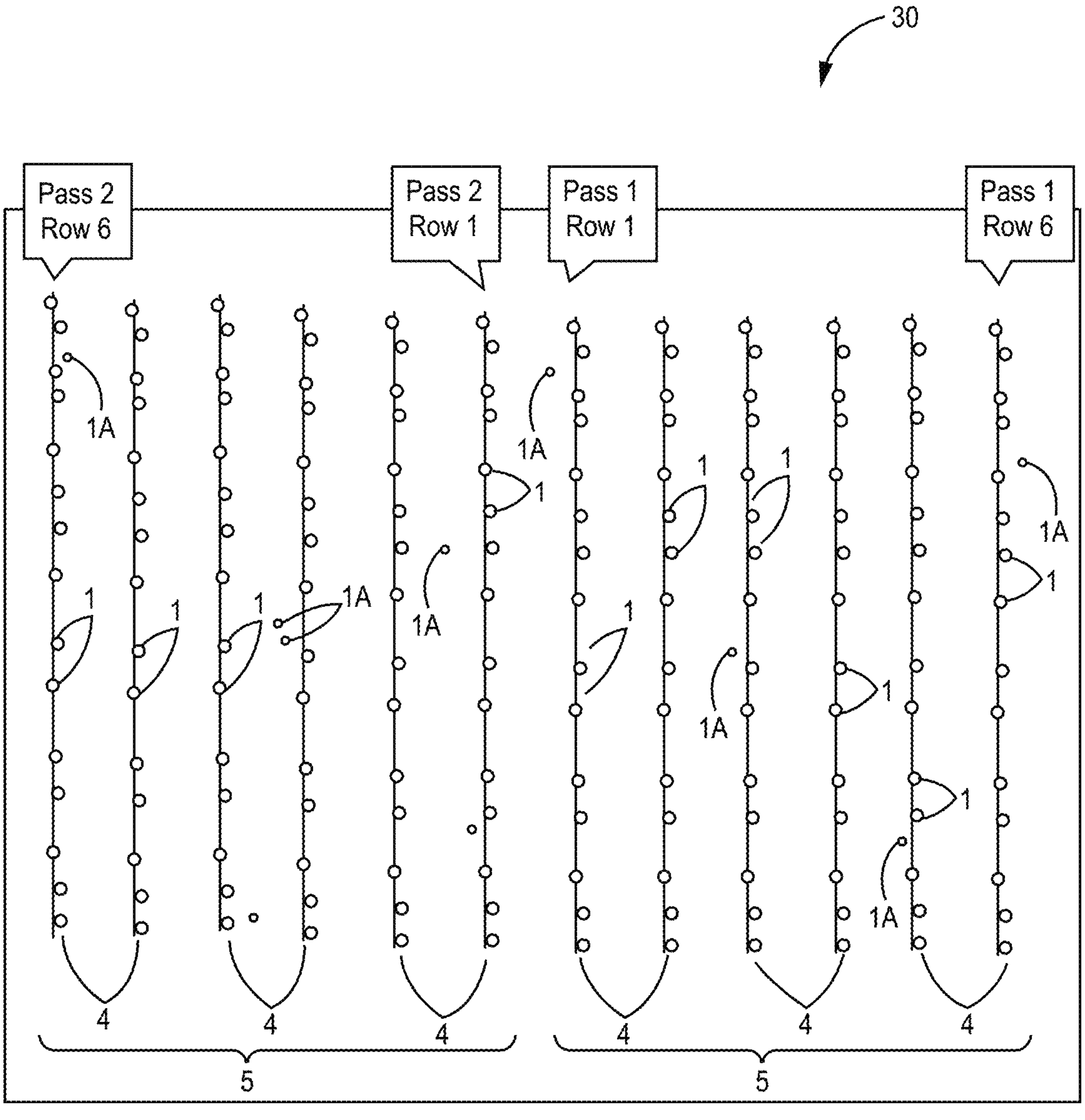
FIG. 17 shows in the data from FIG. 16 overlayed with the as-planted data of FIG. 15, according to one implementation.

FIG. 17 shows the point map 30/plant stand (such as from FIG. 16) overlayed with as planted data (such as from FIG. 15). In this example image, plants 1 within ±3" (or other threshold distance) are considered part of the row 4. The plants 1 within the row 4 can be assigned a pass 5 number and a row 4 number allowing a user to know which plants 1 emerged from which row 4 and which row unit planted each plant. The user and/or system 100 can then compare and analyze the data to determine if a particular pass 5 or row 4 experienced an issue during planting that is effecting overall yield, as would be appreciated.

Plants 1 that are more than a threshold distance from the row 4 can be shown in a contrasting color or other symbol to be easily identified visually by a user. The system 100 may also create a data point or log for each plant 1 not assigned to a row 4. These volunteer plants 1A and weeds are important values as discussed herein. Knowing the distance between rows 4 of sensed plants 1, the distance between rows 4 can then be applied to the plants 1 within the row 4 to know plant 1 spacing and plant 1 populations. If the system 100 knows the distance between the rows 4 is 30" apart, the system 100 can determine a scale for the distance of plants 1 within the same row 4 and find spacing and population, as would be understood.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Although the disclosure has been described with references to various embodiments, persons skilled in the art will recognized that changes may be made in form and detail without departing from the spirit and scope of this disclosure.

What is claimed is:

1. A method for evaluating post-emergence crop stands, comprising:
- collecting overhead images of an area of interest;
- geo-referencing the collected overhead images, by aligning the overhead images with geo-referenced as-planted data;
- processing the collected overhead images to isolate individual plants within the collected images by manipulating the overhead images to distinguish plant pixels from background pixels; and
- determining at least one plant characteristic for each individual plant within the collected images, wherein the at least one plant characteristic comprises an estimated leaf length.

2. The method of claim 1, wherein the at least one plant characteristic further comprises one or more of orientation, surface area, and color.

3. The method of claim 1, wherein processing the collected overhead images comprises adjusting color levels within the collected overhead images to isolate a plant color of interest.

4. The method of claim 1, further comprising performing a Delaunay triangulation routine to model a surface of each individual plant.

5. The method of claim 4, further comprising defining a pixel threshold wherein a triangle with a side having a pixel count below the pixel threshold is considered part of a plant and a triangle with a side having a pixel count above the pixel threshold is considered background.

6. The method of claim 4, further comprising defining a threshold distance within a triangle with a side with a distance below the threshold distance is considered part of a plant and a triangle with a side with a distance above the threshold distance is considered background.

7. The method of claim 5, further comprising removing background from the overhead collected images.

8. The method of claim 4, further comprising:
- identifying a central point of each triangle comprised of plant pixels;
- connecting each of the central points; and
- identifying a junction of two or more central points to locate a stem of the plant.

9. The method of claim 1, further comprising counting each plant within the collected overhead images to determine a stand count.

10. The method of claim 2, further comprising classifying leaf length of an individual plant to estimate a crop growth stage.

11. The method of claim 1, wherein the-geo-referenced as-planted data was recorded by the a field computing device to assign each individual plant to a specific planter row and implement pass.

12. The method of claim 1, further comprising merging collected overhead images with geo-referenced harvest data from the same season to compare emerged plant stand data with harvest data.

13. The method of claim 1, further comprising identifying volunteer plants and weeds.

14. The method of claim 1, further comprising identifying late emerged plants.

15. The method of claim 1, further comprising:
- collecting overhead imagery of the area of interest at a second point in time within the same growing season;
- overlaying the collected overhead imagery from the second point in time with the collected overhead imagery from a first point in time; and
- comparing individual plant growth between the first point in time and the second point in time to identify changes in leaf length within the same growing season.

16. A method for evaluating post emergence crops, comprising:
- capturing overhead images of an area of interest at a first point in time;
- geo-referencing the images with as-planted data, including planter passes;

processing the overhead images to isolate individual plants within the images to distinguish plant pixels from background pixels;

modeling the surface of the individual plants by performing a triangulation routine on the plant pixels to generate a surface model;

generating at least one crop characteristic for each individual plant, the at least one crop characteristic comprising a leaf length;

identifying a location for each individual plant; and comparing the locations with as-planted data of expected plant locations.

17. The method of claim 16, further comprising generating a point map of each plant location.

18. The method of claim 17, further comprising categorizing a plant growth stage for each individual plant by classifying the leaf length for each individual plant and mapping the plant growth stage on the point map.

19. The method of claim 18, further comprising identifying plants more than a threshold distance off a centerline of each crop row, as defined by the as-planted data.

20. A method for comparing as-planted data to post-emergence data to evaluation crop performance within a season, comprising:

acquiring as-planted data from a field computing device;

identifying planter rows for each implement pass based on the as-planted data;

creating a point map of individual plant location from collected overhead images by performing a triangulation routine to identify plant and non-plant pixels;

assigning plants to a planter row and implement pass;

determining any plants that are more than a threshold distance from a centerline of a planter row as defined by the as-planted data and classifying plants as volunteer plants or weeds;

generating a distance between adjacent plants within the same planter row to determine plant spacing and calculating a plant population per acre for each planter row and implement pass, and outputting the plant spacing, plant population per acre, and classification data on a display of the field computing device to enable evaluation of planter performance across rows and passes within the harvest season.

* * * * *